United States Patent
Rowlands et al.

(10) Patent No.: US 6,732,234 B1
(45) Date of Patent: May 4, 2004

(54) DIRECT ACCESS MODE FOR A CACHE

(75) Inventors: Joseph B. Rowlands, Santa Clara, CA (US); Michael P. Dickman, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 125 days.

(21) Appl. No.: 09/633,544

(22) Filed: Aug. 7, 2000

(51) Int. Cl.$^7$ ............................................... G06F 12/00
(52) U.S. Cl. ................. 711/117; 711/118; 711/128; 711/133; 711/136; 711/145; 711/702; 711/108; 711/119
(58) Field of Search ................................ 711/117, 118, 711/128, 133, 160, 136, 139, 145; 702/108, 119

(56) References Cited

U.S. PATENT DOCUMENTS

| | | | |
|---|---|---|---|
| 3,693,165 A | | 9/1972 | Reiley et al. |
| 4,044,338 A | | 8/1977 | Wolf |
| 4,453,212 A | | 6/1984 | Gaither et al. |
| 4,511,994 A | | 4/1985 | Webb et al. |
| 4,575,792 A | * | 3/1986 | Keeley .......................... 714/42 |
| 4,633,440 A | | 12/1986 | Pakulski |

(List continued on next page.)

FOREIGN PATENT DOCUMENTS

| | | |
|---|---|---|
| EP | 0 061 570 | 10/1982 |
| EP | 0 259 095 | 3/1988 |
| EP | 325 420 | 7/1989 |
| EP | 0 381 471 | 8/1990 |
| EP | 0 436 092 | 7/1991 |
| EP | 0 459 232 | 12/1991 |
| EP | 0 459 233 | 12/1991 |
| EP | 0 568 221 | 11/1993 |
| EP | 0 687 979 | 12/1995 |
| EP | 997 821 | 5/2000 |
| GB | 2 214 336 | 8/1989 |
| GB | 2 263 985 | 8/1993 |
| GB | 2 263 987 | 8/1993 |
| GB | 2 281 422 | 3/1995 |

OTHER PUBLICATIONS

Gallup, et al., "Testability Features of the 68040," Motorola, Inc., 1990 International Test Conference, IEEE, pp. 749–757.

Hollenbeck, et al., "PA7300LC Integrates Cache for Cost/Performance," Hewlett Packard Company, IEEE, 1996, pp. 167–174.

International Search Report for EP 26 231–50 mailed Feb. 21, 2003, 7 pages.

(List continued on next page.)

Primary Examiner—Matthew Kim
Assistant Examiner—Zhuo H. Li
(74) Attorney, Agent, or Firm—Lawrence J. Merkel

(57) ABSTRACT

A cache is configured to receive direct access transactions. Each direct access transaction explicitly specifies a cache storage entry to be accessed in response to the transaction. The cache may access the cache storage entry (bypassing the normal tag comparisons and hit determination used for memory transactions) and either read the data from the cache storage entry (for read transactions) or write data from the transaction to the cache storage entry (for write transactions). The direct access transactions may, for example, be used to perform testing of the cache memory. As another example, direct access transactions may be used to perform a reset of the cache (by writing known data to each cache entry). In embodiments employing error checking and correction (ECC) mechanisms, direct access write transactions could also be used to recover from uncorrectable ECC errors, by overwriting the failing data to eliminate the errant data. In one embodiment, the cache may alter the state of its replacement policy in response to a direct access transaction explicitly specifying a particular way of the cache.

40 Claims, 13 Drawing Sheets

U.S. PATENT DOCUMENTS

| | | | |
|---|---|---|---|
| 4,654,778 A | | 3/1987 | Chiesa et al. |
| 4,807,115 A | | 2/1989 | Torng |
| 4,833,642 A | | 5/1989 | Ooi |
| 4,858,105 A | | 8/1989 | Kuriyama et al. |
| 4,907,278 A | | 3/1990 | Cecinati et al. |
| 4,996,641 A | * | 2/1991 | Talgam et al. ............. 711/118 |
| 5,125,083 A | | 6/1992 | Fite et al. |
| 5,163,142 A | | 11/1992 | Mageau |
| 5,193,163 A | * | 3/1993 | Sanders et al. ............ 711/122 |
| 5,226,126 A | | 7/1993 | McFarland et al. |
| 5,226,130 A | | 7/1993 | Favor et al. |
| 5,241,663 A | | 8/1993 | Rohwer |
| 5,317,716 A | | 5/1994 | Liu |
| 5,325,504 A | | 6/1994 | Tipley et al. |
| 5,353,425 A | | 10/1994 | Malamy et al. |
| 5,369,753 A | | 11/1994 | Tipley ....................... 711/122 |
| 5,377,345 A | | 12/1994 | Chang et al. |
| 5,416,783 A | | 5/1995 | Broseghini et al. |
| 5,432,918 A | | 7/1995 | Stamm |
| 5,450,551 A | | 9/1995 | Amini et al. |
| 5,471,598 A | | 11/1995 | Quattromani et al. |
| 5,487,162 A | | 1/1996 | Tanaka et al. |
| 5,493,667 A | | 2/1996 | Huck et al. |
| 5,510,934 A | | 4/1996 | Brennan et al. |
| 5,524,208 A | * | 6/1996 | Finch et al. ................. 714/25 |
| 5,526,510 A | | 6/1996 | Akkary et al. |
| 5,539,878 A | * | 7/1996 | Kikinis ........................ 714/30 |
| 5,551,001 A | | 8/1996 | Cohen et al. |
| 5,557,763 A | | 9/1996 | Senter et al. |
| 5,564,034 A | | 10/1996 | Miyake |
| 5,584,014 A | | 12/1996 | Nayfeh et al. |
| 5,586,253 A | * | 12/1996 | Green et al. ................. 714/53 |
| 5,586,293 A | | 12/1996 | Baron et al. |
| 5,588,126 A | | 12/1996 | Abramson et al. |
| 5,592,679 A | | 1/1997 | Yung |
| 5,638,537 A | | 6/1997 | Yamada et al. |
| 5,644,752 A | | 7/1997 | Cohen et al. |
| 5,668,815 A | | 9/1997 | Gittinger et al. |
| 5,668,972 A | | 9/1997 | Liu et al. |
| 5,671,444 A | | 9/1997 | Akkary et al. |
| 5,748,640 A | | 5/1998 | Jiang et al. |
| 5,752,261 A | * | 5/1998 | Cochcroft, Jr. ............. 711/128 |
| 5,761,712 A | | 6/1998 | Tran et al. |
| 5,768,555 A | | 6/1998 | Tran et al. |
| 5,784,588 A | | 7/1998 | Leung |
| 5,787,490 A | * | 7/1998 | Ozawa ....................... 709/103 |
| 5,802,338 A | | 9/1998 | Rechtschaffen et al. |
| 5,809,528 A | | 9/1998 | Miller et al. |
| 5,809,531 A | | 9/1998 | Brabandt |
| 5,875,465 A | | 2/1999 | Kilpatrick et al. |
| 5,913,224 A | | 6/1999 | MacDonald |
| 5,974,507 A | | 10/1999 | Arimilli et al. |
| 5,983,321 A | | 11/1999 | Tran et al. |
| 6,115,792 A | * | 9/2000 | Tran ........................... 711/128 |
| 6,148,370 A | * | 11/2000 | Kobayashi .................. 711/118 |
| 6,161,167 A | | 12/2000 | Witt |
| 6,185,657 B1 | | 2/2001 | Moyer ........................ 711/128 |
| 6,185,703 B1 | * | 2/2001 | Guddat et al. .............. 714/718 |
| 6,237,083 B1 | | 5/2001 | Favor |
| 6,240,432 B1 | | 5/2001 | Chuang et al. |
| 6,240,532 B1 | * | 5/2001 | Cho ............................ 714/42 |
| 6,263,082 B1 | | 7/2001 | Ishimoto et al. |
| 6,269,427 B1 | | 7/2001 | Kuttanna et al. |
| 6,295,608 B1 | | 9/2001 | Parkes et al. |
| 6,351,789 B1 | | 2/2002 | Green |
| 6,405,287 B1 | | 6/2002 | Lesartre ...................... 711/128 |
| 6,606,686 B1 | * | 8/2003 | Agarwala et al. ........... 711/129 |

OTHER PUBLICATIONS

*Intel® StrongARM® SA–1100 Microprocessor, Developer's Manual*, Aug. 1999, © Intel Corporation, Ch. 1, p. 6; Ch. 2, p. 2; Ch. 6, pp. 2–5; Ch. 7, p. 3.

"Memory Arbitration with Out of Order Execution in Conjunction with a RISC System," IBM Technical Disclosure Bulletin, Sep. 1992, pp. 62–64.

"Handling Reservations in Multiple–Level Cache," IBM Technical Disclosure Bulletin, Dec. 1993, pp. 441–446.

Stepanian, SiByte, SiByte SB–1 MIPS64 CPU Core, Embedded Processor Forum 2000, Jun. 13,2 000, 15 pages.

Dekker et al., "A Realistic Fault Model and Test Algorithms for Static Random Access Memories," IEEE Transactions on Computer–Aided Design, vol. 9, No. 6, Jun. 1990, pp. 567–572.

Halfhill, "SiByte Reveals 64–bit Core for NPUs," Microprocessor Report, Jun. 2000, pp. 45–48.

Cyrix® 5x86 Microprocessor, Jul. 1995, 8 pgs.

Cyrix® 6=86 Mircoprocessor, Aug. 1995, 6 pgs.

* cited by examiner

DIRECT ACCESS MODE FOR A CACHE

BACKGROUND OF THE INVENTION

1. Field of the Invention

This invention is related to digital systems and, more particularly, to caches within digital systems.

2. Description of the Related Art

Processors and/or the computer systems including the processors typically provide caches to alleviate the high memory latency frequently experienced in computer systems. Generally, a cache is a relatively small, high speed memory which may store copies of data corresponding to various recently-accessed memory locations. Generally, cache storage is allocated and deallocated in units of cache lines (a group of bytes from contiguous memory locations). In other words, the cache may include multiple entries, and each entry may include storage for a cache line of bytes. If requested data for an access is not in the cache (a "miss"), an entry is allocated for the cache line including the requested data and the cache line is filled into the allocated entry. Subsequently, the data may be found in the cache upon request (a "hit"). In some cases, a portion of the cache line (often called a "sector") may be valid while other portions are invalid. However, the entire cache entry is allocated for the cache line if one or more of the sectors are valid.

It is generally necessary to test the memory (including cache memory) of an integrated circuit or system (e.g. after manufacture and prior to shipping to a customer) to ensure that the memory has no defects. Defects may occur due to contamination in the fabrication of the memory circuit, a problem with the masks used during the fabrication, or other manufacturing errors.

Typically, the testing of memories has been performed by including-hardware embedded in the memory or situated close to the memory to perform the testing. This hardware is typically referred to as built-in self test (BIST) hardware. Since the BIST hardware is used only for testing purposes, the BIST hardware must be as small (in terms of circuit area, e.g. numbers of transistors) as possible to minimize the cost of the BIST hardware. Thus, the testing strategies that may be applied by BIST hardware have generally been limited to those strategies that can be implemented using a minimal amount of hardware. Furthermore, if the BIST hardware itself is implemented incorrectly, false failures or incomplete test coverage may result. A more flexible method for testing a memory is therefore desired.

SUMMARY OF THE INVENTION

The problems outlined above are in large part solved by a cache as described herein. The cache is configured to receive direct access transactions. Each direct access transaction explicitly specifies a cache storage entry to be accessed in response to the transaction. The cache may access the cache storage entry (bypassing the normal tag comparisons and hit determination used for memory transactions) and either read the data from the cache storage entry (for read transactions) or write data from the transaction to the cache storage entry (for write transactions).

The direct access transactions may, for example, be used to perform testing of the cache memory. Direct access transactions may be used to read and/or write test data from specific cache entries. Advantageously, BIST hardware may be eliminated in favor of performing testing of the cache using direct access transactions. Accordingly, risks due to faulty implementation of the test strategy in hardware may be alleviated. If an error in the test implementation is made, the error may be corrected by changing the test transactions.

Furthermore, in one embodiment, a processor may be used to initiate the direct access transactions by executing a code sequence. Thus, flexibility may be achieved in the test algorithms used by coding appropriate code sequences. More complex test algorithms may be more readily implemented using such a testing strategy than may be used for BIST hardware, since the requirement to keep the BIST hardware small and simple may be eliminated.

Still further, since the test is based on transactions received by the cache, testing may be performed by any device capable of communicating with the cache. Accordingly, even if the processor is not functioning properly, the cache may be tested by another device.

As another example, direct access transactions may be used to perform a reset of the cache (by writing known data to each cache entry). Thus, circuitry for ensuring that the cache resets to a known state may be eliminated. In embodiments employing error checking and correction (ECC) mechanisms, the ECC data may be initialized during the writing of data in response to the direct access transactions, eliminated spurious ECC errors that might occur if uninitialized data were read from the cache. Direct access write transactions could also be used to recover from uncorrectable ECC errors, by overwriting the failing data to eliminate the errant data.

In one embodiment, the cache may alter the state of its replacement policy in response to a direct access transaction explicitly specifying a particular way of the cache. The state may be altered such that a succeeding cache miss causes an eviction of the particular way. Such an embodiment may be used to enhance the test coverage achievable with direct access transactions by providing the flexibility of using memory transactions to store test data into the cache. Testing of tag information may be more thorough in such an embodiment. Furthermore, the combination of direct access transactions and the deterministic setting of the replacement policy may have other uses (e.g. for flushing a cache entry or all cache entries without requiring an explicit flush command).

Broadly speaking, a cache is contemplated. The cache includes a memory and a control circuit coupled to the memory. The memory includes a plurality of entries. Each of the plurality of entries is configured to store a cache line of data. The control circuit is configured to select a first entry of the plurality of entries for access responsive to a first transaction which explicitly specifies the first entry.

Additionally, a system is contemplated including a cache and a first circuit coupled to the cache. The cache includes a plurality of entries. Each of the plurality of entries is configured to store a cache line of data. The first circuit is configured to initiate a first transaction explicitly specifying a first entry of the plurality of entries. The cache is configured to select the first entry for access responsive to the first transaction.

A method for testing a cache is also contemplated. A first transaction is performed to cause first data to be stored in a first entry of a cache. A read transaction explicitly specifying the first entry subsequent to performing the first transaction. The second data returned in response to the read transaction is compared to the first data to detect if an error occurred in the first entry.

BRIEF DESCRIPTION OF THE DRAWINGS

Other objects and advantages of the invention will become apparent upon reading the following detailed description and upon reference to the accompanying drawings in which.

Figure 1:
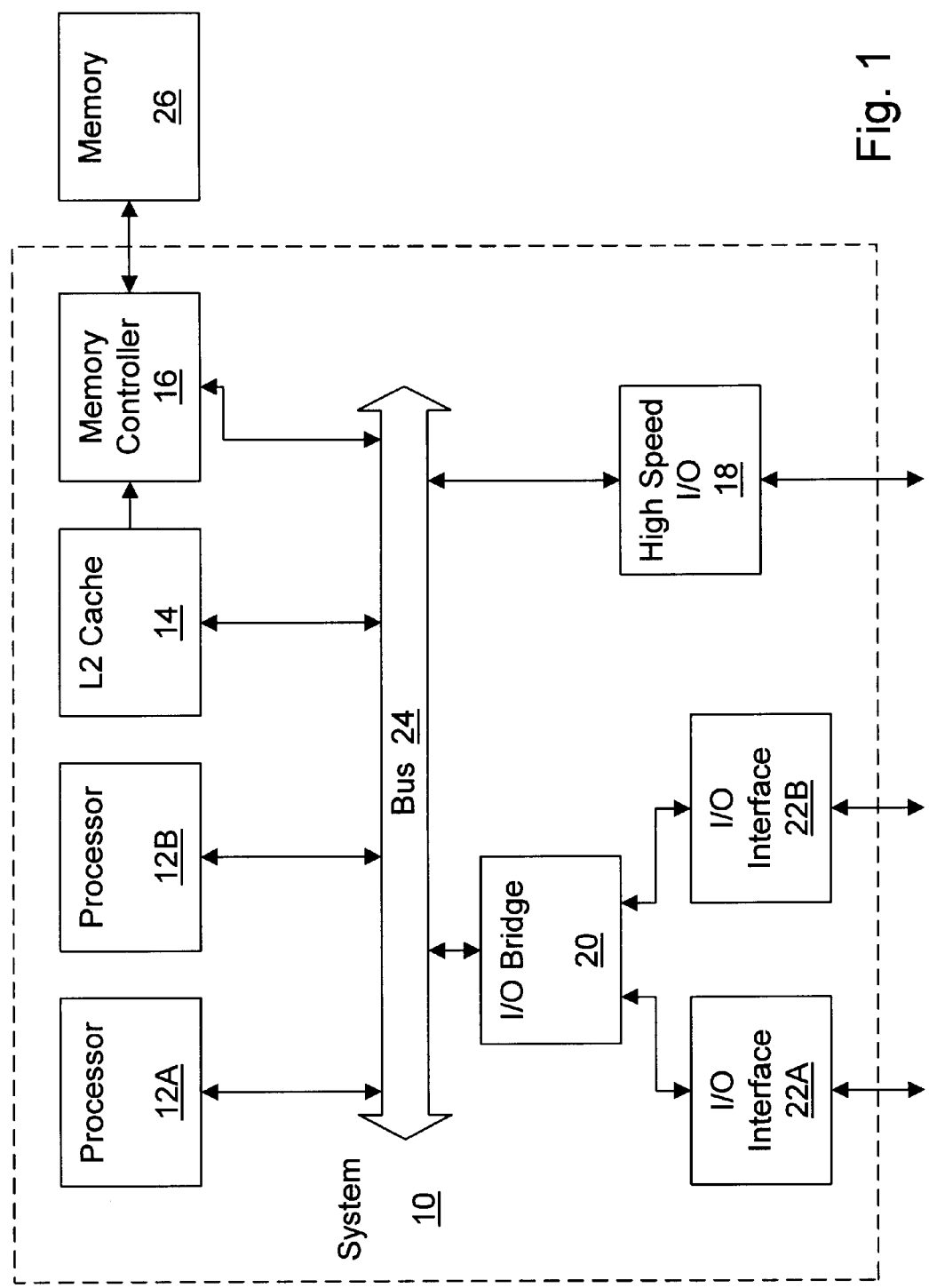
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a high speed input/output (I/O) bridge 18, an I/O bridge 20, and I/O interfaces 22A–22B. System 10 may include a bus 24 for interconnecting the various components of system 10. As illustrated in FIG. 1, each of processors 12A–12B, L2 cache 14, memory controller 16, high speed I/O bridge 18 and I/O bridge 20 are coupled to bus 24. I/O bridge 20 is coupled to I/O interfaces 22A–22B. L2 cache 14 is coupled to memory controller 16, which is further coupled to a memory 26.

Generally, processors 12A–12B and/or the I/O bridges/interfaces may initiate transactions on the bus 24. Transactions may include read transactions (transfers of data to the transaction initiator) and write transactions (transfers of data from the transaction initiator). Transactions may further include various coherency commands (e.g. an invalidate command) which may or may not involve a transfer of data.

System 10 supports various types of transactions on bus 24. Memory transactions are transactions which target a memory location. Additionally, system 10 supports direct access transactions to L2 cache 14. As used herein, the term "direct access transaction" refers to a transaction which targets an entry in L2 cache 14 and explicitly specifies that entry. If the direct access transaction is a read, the data in the specified entry is returned by L2 cache 14. If the direct access transaction is a write, the data provided in the write transaction is stored in the entry. System 10 may further support I/O transactions and configuration transactions on bus 24.

An addressable range of system 10 is defined by the size of the addresses which may be transmitted on bus 24. The addressable range may be divided into several address spaces including a memory address space, a direct access address space, an I/O address space, and various configuration address spaces. In this embodiment, the address space which includes the address of a transaction may identify the type of the transaction. Thus, an address within the memory address space indicates that the transaction is a memory transaction and the address identifies a targeted memory location in memory 26 (and thus memory controller 16 and L2 cache 14 may respond to the transaction). An address within the I/O memory mapped address space indicates that the transaction is an I/O transaction and the address targets an I/O device on one of the I/O interfaces. An address within the configuration address space indicates that the transaction is a configuration transaction and the address targets various configuration registers in devices within system 10.

An address within the direct access address space indicates that the transaction is a direct access transaction and the address specifies the entry of L2 cache 14 to be directly accessed by the direct access transaction. For memory transactions, the entry (if any) of L2 cache 14 accessed to store or return data for the memory transaction is determined by comparing the tags of cache lines stored in the entries to the address of the memory transaction. On the other hand, direct access transactions explicitly specify the entry to be accessed. L2 cache 14 may access the specified entry without regard to the tag comparisons normally used to select the accessed entry. In one embodiment, direct access transactions may transfer an entire cache line of data. However, other embodiments may transfer a portion of a cache line in response to direct access transactions.

While the above description uses address spaces to determine transaction type, other embodiments may determine transaction type in other ways. For example, command type encodings could be provided on control signals transmitted during the address portion of the transaction.

Using direct access transactions, L2 cache 14 may be tested for defects by any device attached to bus 24. The device may initiate direct access transactions to read and write the entries of L2 cache 14. Test data may be written, and then read back and checked to ensure that no errors occurred in storing of the test data in the specified entry. Each entry may be tested in this manner. For example, one of processors 12A–12B may execute a code sequence which performs the desired tests. Since the tests are performed via software, the test algorithm is flexible and may easily be changed. The problem of incorrectly implementing a test algorithm in BIST hardware may thus be eliminated. Additionally, since software is used to implement the test instead of BIST hardware, there may be more flexibility in the algorithms that can be used since the requirement to keep the hardware small is eliminated.

Additionally, since the test is conducted via transactions received by L2 cache 14, any device attached to the bus 24 may be used to perform the test. Thus, if there is a problem (bug, manufacturing defect, etc.) with one or both of processors 12A–12B, other devices may be used to perform the test. In one embodiment, the direct access address space is located within 32 bits of address (i.e. more significant bits than the 32 bits are zero), which allows any device capable of generating 32 bits of address to perform direct access transactions. Thus, for example, a device on the PCI bus (one example of an I/O interface) could be used to perform the tests. Accordingly, testing can be performed even if processors 12A–12B are non-functional.

In addition to specifically identifying an entry, another advantage direct access transactions may have over attempting to use memory transactions to perform testing is that, if an entry has a defect in the tag portion of the entry, it may be difficult to get a hit in that entry (since the tag is stored in a faulty manner). By using direct access transactions, the hit circuitry is ignored and the specified entry is accessed.

In one embodiment, L2 cache 14 may include a register which captures the tag =portion of the specified entry in response to direct access transactions. This register may be read as part of the test transactions, to check that the tag is stored without error as well.

In one embodiment, L2 cache 14 may employ error checking and correction (ECC) to protect the tags and/or data in the cache. If an uncorrectable ECC error is detected, a direct access write transaction may be used to overwrite the entry for which the error is detected. In this manner, the data in error may be eliminated from the cache. ECC bits corresponding to the data being written may be generated and stored by L2 cache 14 in response to the direct access write transaction.

In one embodiment L2 cache 14 includes a replacement circuit implementing the replacement policy of the cache. The replacement circuit may, in response to a direct access transaction specifying a first way, establish a state corresponding to the first way. If the next transaction is a memory transaction which misses L2 cache 14, the first way may be selected from the addressed set for eviction. In this manner, the way selected for the next memory transaction is deterministic. Alternatively, the replacement circuit may establish a state responsive to other types of transactions than direct access transactions. For example, the replacement circuit may be memory-mapped for a write transaction to a predetermined address, and the data in the write transaction may indicate the desired state (or the first way). As another example, a dedicated bus command could be used to convey the state or the first way.

The deterministic setting of the replacement policy may be used for enhanced testing. Since the direct access transactions, in one embodiment, are determined from an address space, some of the address bits in the tag of the entry may not be varied using direct access write transactions. Thus, a direct access transaction to the desired way may be performed, followed by a memory transaction (which misses the cache) to the desired index. The miss by the memory transaction causes an eviction to store the cache line addressed by the memory transaction, and the evicted cache line is from the desired way. The tag is updated with the address of the memory transaction. Subsequently, a direct access read transaction may be performed, and the tag may be captured by the above mentioned register. The tag may be checked to ensure it was stored without error. Thus, additional freedom in varying the tag bits may be achieved.

The deterministic setting of the replacement policy may have other uses as well. For example, the deterministic setting may be used, after various initialization procedures have been performed, to provide a synchronization point for the replacement policy. This may be useful in validation, especially if similar tests are to be run in different test environments. Furthermore, controlling which entry will be used for a miss may be useful generally in validation testing. Additionally, the deterministic setting may be used to flush L2 cache 14 without requiring an explicit flush command on bus 24. Instead, sequences of a direct access transaction (to set the replacement policy) followed by a memory transaction which misses (to evict the cache line in the selected way) may be used to flush the cache.

In one embodiment, the replacement policy of L2 cache 14 is a pseudo-random policy (also referred to simply as random). In a "pseudo-random" policy, the replacement circuit sequences through a set of states, and the state existing when a particular miss is detected determines the way selected for eviction. In such a replacement policy, a state may be established consistent with selection of the way identified by the direct access transaction to provide determinism for a succeeding eviction.

Other replacement policies may be used as well. For example, if a least recently used (LRU) policy is employed, the LRU policy for the index identified by the direct access transaction may be set to indicate that the way identified by the direct access transaction is least recently used. A subsequent miss to the same index may generate an eviction of the way identified by the direct access transaction.

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be a lower level cache than L2. L2 cache 14 may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 26 in response to memory transactions received on bus 24. Memory controller 16 receives a hit signal from L2 cache 14, and if a hit is detected in L2 cache 14 for a memory transaction, memory controller 16 does not respond to that memory transaction. If a miss is detected by L2 cache 14, or the memory transaction is non-cacheable, memory controller 16 may access memory 26 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

High speed I/O bridge 18 may be an interface to a high speed I/O interconnect. For example, high speed I/O bridge 18 may implement the Lightning Data Transport (LDT) I/O fabric developed by Advanced Micro Devices, Inc. Other high speed interfaces may be alternatively used.

I/O bridge 20 is used to link one or more I/O interfaces (e.g. I/O interfaces 22A–22B) to bus 24. I/O bridge 20 may serve to reduce the electrical loading on bus 24 if more than one I/O interface 22A–22B is bridged by I/O bridge 20. Generally, I/O bridge 20 performs transactions on bus 24 on behalf of I/O interfaces 22A–22B and relays transactions targeted at an I/O interface 22A–22B from bus 24 to that I/O interface 22A–22B. I/O interfaces 22A–22B may be lower bandwidth, higher latency interfaces. For example, I/O interfaces 22A–22B may include one or more serial interfaces, Personal Computer Memory Card International Association (PCMCIA) interfaces, Ethernet interfaces (e.g. media access control level interfaces), Peripheral Component Interconnect (PCI) interfaces, etc.

Bus 24 may have any suitable protocol and construction. According to one implementation, bus 24 may be a split transaction bus. The implementation may include an address bus supporting up to 40 bits of addressable range and a data bus capable of transmitting one cache line per clock cycle (e.g. 32 bytes). Other widths for either the address bus or data bus are possible and contemplated. The bus may also include transactions to support maintaining memory coherency (e.g. an invalidate command). The bus may use any suitable signalling technique (e.g. differential or non-differential signalling).

It is noted that system 10 (and more particularly processors 12A–12B, L2 cache 14, memory controller 16, I/O interfaces 22A–22B, I/O bridge 20, I/O bridge 18 and bus 24 may be integrated onto a single integrated circuit as a system on a chip configuration. In another configuration, memory 26 may be integrated as well. Alternatively, one or more of the components may be implemented as separate integrated circuits, or all components may be separate integrated circuits, as desired. Any level of integration may be used.

As used herein, a transaction "targets" a location or device if the location or device is the provider of data for the transaction (for a read transaction) or receiver of data for the transaction (for a write transaction). Viewed in another way, a transaction may target a location or device if the address of the transaction is mapped to that location or device.

Figure 2:
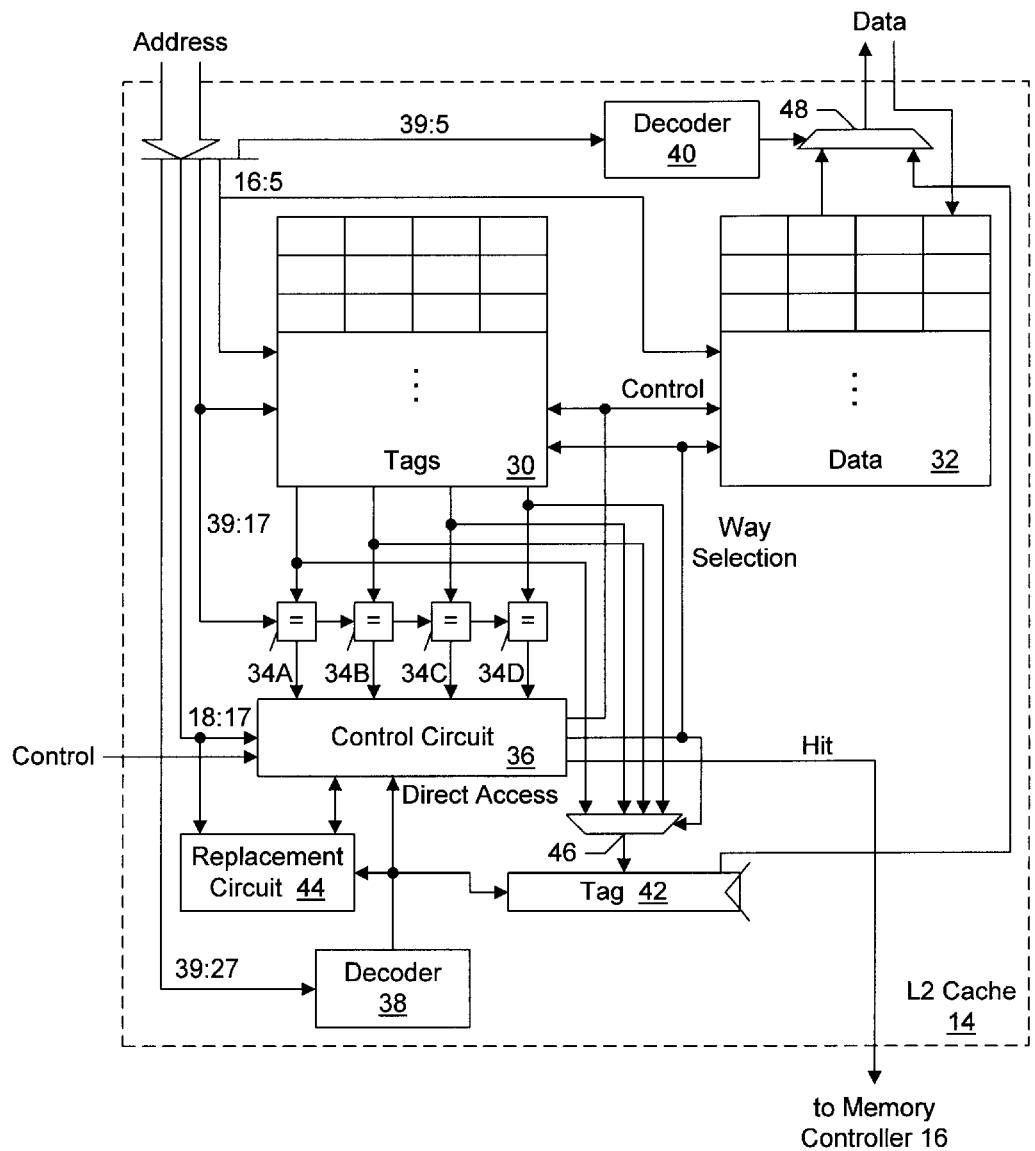
FIG. 2 is a block diagram of one embodiment of a cache shown in FIG. 1.

Turning now to FIG. 2, a block diagram of one embodiment of L2 cache 14 is shown. Other embodiments are possible and contemplated. In the embodiment of FIG. 2, L2 cache 14 includes a tags memory 30, a data memory 32, a set of comparators 34A–34D, a control circuit 36, a pair of decoders 38 and 40, a tag register 42, a replacement circuit 44, and multiplexors (muxes) 46 and 48. Tags memory 30 and data memory 32 are each coupled to receive an index portion of the address of a transaction (the address of the transaction may be referred to herein as the "input address").

Data memory 32 is coupled to receive and provide data corresponding to the transaction. Tags memory 30 is further coupled to receive a tag portion of the input address, and is coupled to comparators 34A–34D and mux 46. Comparators 34A–34D are further coupled to receive the tag portion of the input address and are coupled to control circuit 36. Control circuit 36 is coupled to receive a portion of the input address, control information corresponding to a transaction, and a direct access signal from decoder 38. Control circuit 36 is coupled to provide a way selection to tags memory 30, data memory 32, and mux 46. Control circuit 36 is further coupled to provide control signals to tags memory 30 and data memory 32, and is coupled to provide a hit signal to memory controller 16. Control circuit 36 is still further coupled to tag register 42 and replacement circuit 44, which is further coupled to receive a portion of the input address and the direct access signal from decoder 38. Tag register 42 is coupled to receive the direct access signal and is coupled to mux 48. Decoders 38 and 40 are coupled to receive a portion of the input address, and decoder 40 is coupled to mux 48.

Generally, tags memory 30 stores the tag information for each entry in L2 cache 14, and data memory 32 stores the cache line of data for each entry in L2 cache 14. Thus, an entry comprises a tag memory storage location and a data memory storage location. The tag memory storage location stores the tag for the entry (and possibly other information, such as validity and dirty information). For example, in one implementation, the tag information for an entry includes the tag portion of the address (e.g. bits 39:17 in the illustrated embodiment), a valid bit indicating the validity or lack of validity of the entry, and a dirty bit indicating the dirty or clean state of the cache line. A cache line is dirty if at least one byte of the cache line has been modified in L2 cache 14 and the modification has not been written to memory 26. The data memory storage location stores the cache line of data in the entry.

During memory transactions, the index portion of the input address (e.g. bits 16:5 in the illustrated embodiment) is provided to tags memory 30 and data memory 32. Each memory selects a set of storage locations in response to the index. Tags memory 30 outputs the tag from each selected storage location to comparators 34A–34D, which compare the tags to the tag portion of the input address. If the tag compares equally, and the entry is valid, the corresponding comparator 34A–34D may signal a hit to control circuit 36. Control circuit 36 may assert the hit signal to memory controller 16 if any of the comparators 34A–34D indicates a hit, and may determine a way selection from the output of comparators 34A–34D as well. Each comparator 34A–34D is comparing the tag from a different way of L2 cache 14, and thus the comparator output indicating a hit is an indication of the hitting way. Control circuit 36 provides the way selection to tags memory 30 and data memory 32.

Data memory 32 provides data from the storage location at the selected index and way, or receives data into that storage location, depending upon whether the memory transaction is a read or write transaction. Control circuit 36 receives the control information corresponding to the transaction, and generates control signals for data memory 32 and tags memory 30. The control signals may include, for example, an enable signal and a read/write signal to indicate whether the memory is to read or write.

Tags memory 30 may be updated in response to the transaction as well. For example, if the transaction is a write, the dirty bit in the hitting entry may be updated. Additionally, if the transaction is a miss in L2 cache 14 and is cacheable, L2 cache 14 may select a way for eviction to receive a line fill of the missing line. More particularly, replacement circuit 44 may be configured to select the way to be evicted. The evicted way may be provided as the way selection, and the valid bit in the evicted entry may be cleared to invalidate the cache line. The cache line may also be provided from data memory 32 for writing to memory 26 if the cache line is dirty. It is noted that tag updates and evictions may not occur in the same clock cycle that L2 cache 14 is accessed to determine the hit/miss of the input address, in some embodiments.

Replacement circuit 44 may additionally change state responsive to a memory transaction. The state may be changed after each memory transaction, regardless of whether the transaction is a hit or miss, or may be changed only after memory transactions which miss, according to design choice.

During direct access transactions, control circuit 36 receives an assertion of the direct access signal from decoder 38. Decoder 38 decodes the address of the transaction to detect that the address is in the direct access address space, and asserts the direct access signal if the address is in the direct access address space. For example, in the illustrated embodiment, the direct access address space may be the addresses having a predetermined combination of address bits 39:27. In one particular implementation, the combination of bits 39:28 may be (in hexadecimal) 00D and bit 27 may be 0. It is noted that the address space may be made smaller by including more of the most significant address bits to decoder 38 (e.g. additional bits below bit position 27) or larger by decoding fewer bits. Furthermore, the selection of an address range for the direct access address space is arbitrary and may be located anywhere in the addressable range, as desired.

In response to the direct access signal, control circuit 36 ignores the hit signals from comparators 34A–34D. The direct access transaction is treated as a cache hit. The entry to be accessed (read or written) is explicitly identified by the direct access transaction. For example, in the present embodiment, address bits other than those used to identify the direct access address space are used to supply the index and way of the entry. More particularly in the illustrated embodiment, the same address bits used to index the cache in memory transactions are used to supply the index in a direct access transaction. In this manner, additional hardware to provide the index to tags memory 30 and data memory 32 for direct access transactions may be avoided. The way is supplied in other address bits (e.g. more significant address bits than the index). In the illustrated embodiment, the more significant address bits contiguous to the index bits are used to convey the way selection (e.g. address bits 18:17 provided to control circuit 36). Control circuit 36 provides the way selection indicated by the direct access transaction as the way selection to tags memory 30 and data memory 32.

Since the hit signals from comparators 34A–34D are ignored by control circuit 36 for direct access transactions, the tag of the selected entry need not match the tag portion of the input address for direct access transactions. If the direct access transaction is a read, the data in the selected entry is provided regardless of any tag match or mismatch. If the direct access transaction is a write, the data provided in the direct access transaction is written to the selected entry, overwriting the data currently stored in the entry. For direct access write transactions, control circuit 36 may update the tag in the selected entry with the tag portion of the input address. In this manner, if the entry was previously storing valid memory transaction data, the entry will be a miss for memory transactions affecting that memory transaction data. Additionally, bits in the tag portion of the input address may be used to specify the desired state of the valid and dirty bits in the tag information. These bits may be written to the valid and dirty bits in the tag information of the specified entry. Additionally, since the direct access transactions are treated as cache hits, there may be no eviction of a cache line in response to direct access transactions.

Control circuit 36 may assert the hit signal to memory controller 16 in response to direct access transactions, if desired. Alternatively, since the illustrated embodiment employs a separate address space for memory transactions and direct access transactions, memory controller 16 may ignore direct access transactions on bus 24.

Replacement circuit 44 also receives the direct access signal and the portion of the input address specifying the way for direct access transactions. If a direct access transaction is detected, replacement circuit 44 establishes a state corresponding to the way specified by the direct access transaction. Thus, if the next memory transaction is a miss, replacement circuit 44 selects the way specified by the direct access transaction for eviction.

Tag register 42 receives the direct access signal as well, and may use the signal as a write enable. Tag register 42 receives, as a data input, the tag information from the way selected for the transaction. More particularly, tag register 42 may receive a data input from mux 46. Mux 46 receives the tag information from the indexed entries, and selects the tag information from one of the indexed entries using the way selection provided by control circuit 36 as a selection control. Since, for direct access transactions, the way selection is the way specified by the direct access transaction, mux 46 selects the tag information corresponding to the entry specified by the direct access transaction. Thus, tag register 42 captures the tag information of the entry specified by the direct access transaction. The information captured by tag register 42 may include the tag portion of the address as well as other tag information (e.g. the valid indication and the dirty indication). In one embodiment, the tag may be protected by ECC. The ECC bits may be captured by tag register 42 as well. In one embodiment, the way from which the tag was read may also be captured by register 42.

Tag register 42 outputs the data stored therein to mux 48. Decoder 40 provides the selection control to mux 48, and selects the data from data memory 32 unless a transaction to the address mapped to register 42 is detected. Tag register 42 may be mapped to any suitable address within the addressable range. Decoder 40 decodes the address of a transaction and, if the address is the address to which tag register 42 is mapped, decoder 40 selects the contents of tag register 42 via mux 48.

It is noted that the embodiment illustrated in FIG. 2 shows various exemplary address bit ranges for a particular implementation of the L2 cache (e.g. 4 way set associative, 512 kilobytes, with 32 byte cache lines) and the size of the addresses provided on bus 24. Other embodiments may vary any of these features and the bit ranges may be updated accordingly. For example, if more ways are provided, the bit range providing the way for direct access transactions may be increased. If the size of the cache is increased and the number of ways remains the same, the index bit range may be expanded (and the tag range reduced). Also, the bit range for the way selection may be moved to accommodate the larger index. The size of the address (40 bits in the illustrated embodiment) may be varied, affecting the bit ranges appropriately as well. Furthermore, the bit ranges may be selected differently in different implementations, according to design choice.

It is noted that, while tags memory 30 and data memory 32 are illustrated separately in FIG. 2, these memories may be integrated if desired. Generally, tags memory 30 and data memory 32 may form a memory for storing tags and corresponding cache lines of data, whether the memory is divided into portions as illustrated or is a single integrated memory.

It is noted that, while the embodiment illustrated in FIG. 2 detects direct access transactions via an address space, other embodiments may detect direct access transactions in other ways. For example, an alternative embodiment may employ different encodings on the control signals of bus 24 to identify memory transactions and direct access transactions, if desired.

It is noted that, while the illustrated embodiment conveys the index and way as portions of the address of a direct access transaction, other embodiments may convey this information on separate control signals, if desired. Furthermore, rather than using an index and way to identify an entry, each entry could be assigned an entry number and the entry number may be conveyed (as part of the address of a direct access transaction or on control signals, for example). Generally, any method of transmitting an identification of the way may be used to explicitly identify the first entry. It is still further noted that, while the illustrated embodiment is set associative, other embodiments may have other configurations. For example, direct mapped embodiments are contemplated (in which an entry may be identified by index only, by an entry number, or any other method of transmitting the identification) and fully associative embodiments are contemplated (in which an entry may be identified by way only, by an entry number, or any other method of transmitting the identification).

It is noted that FIG. 2 illustrates address, data, and control signals being supplied to the L2 cache circuitry. L2 cache 14 may include buffers or queues (not shown) to capture address and data portions of transactions. The supplied address, data, and control signals may correspond to the transaction at the head of the buffers or queues.

Figure 3:
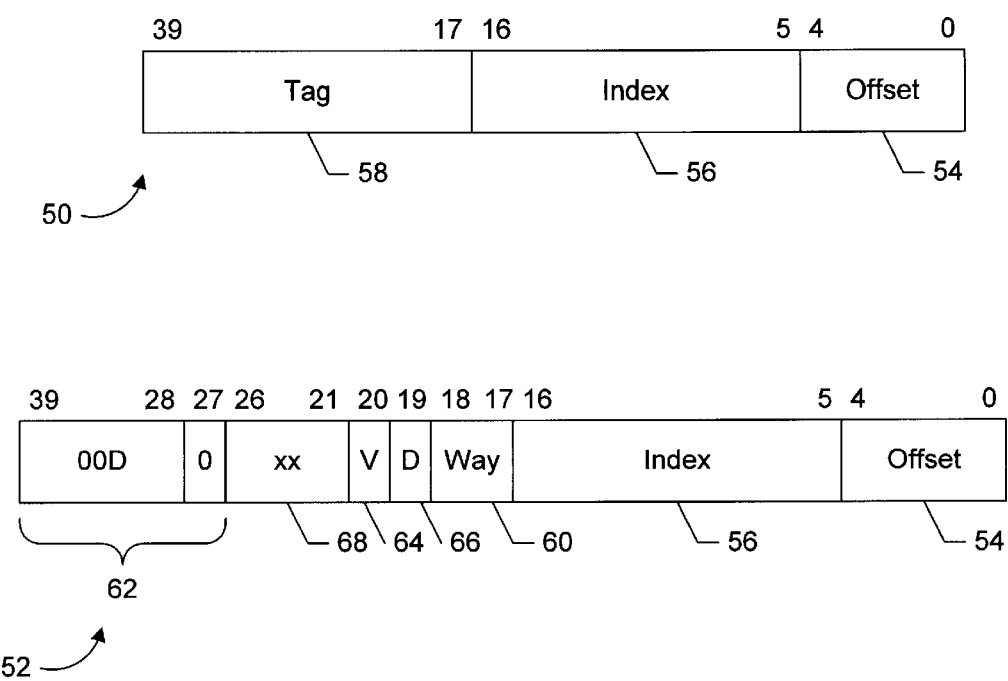
FIG. 3 is a block diagram of one embodiment of an address from a memory address space and one embodiment of an address from a direct access address space.

Turning now to FIG. 3, a block diagram illustrating an exemplary memory transaction address 50 and an exemplary direct access transaction address 52 is shown. The addresses illustrated in FIG. 3 may correspond to the embodiment illustrated in FIG. 2.

Memory transaction address 50 includes an offset field 54, an index field 56, and a tag field 58. Offset field 54 includes the bits defining the offset within a cache line. Index field 56 includes the bits used to index L2 cache 14 (e.g. bits 16:5 in the embodiment illustrated in FIG. 2). Tag field 58 includes the remaining bits of the address not included in offset field 54 and index field 56. Tag field 58 includes the address bits stored in tag memory 30 and compared to the corresponding portion of the input address.

Direct access transaction address 52 includes offset field 54 and index field 56, similar to memory transaction address 50. Additionally, direct access transaction address 52 includes a way field 60 identifying the way to be accessed in response to the direct access transaction (e.g. bits 18:17 in the embodiment illustrated in FIG. 2). A field 62 including a set of most significant bits of direct access transaction address 52 are encoded to select the direct access memory address space (e.g. bits 39:27 in the embodiment illustrated in FIG. 2). Any encoding may be used to identify the direct access address space according to design choice. Direct access transaction address 52 further includes a valid bit 64 and a dirty bit 66. These bits may be written to the valid and dirty bits of the selected tag entry if a tag update is performed (e.g. in response to a direct access write transaction, in one embodiment). Additionally, since way field 60, valid bit 64 and dirty bit 66 are part of the tag portion of the address in the illustrated embodiment, these bits are written to the corresponding tag bits in the selected tag entry as well. The remaining bits of the direct transaction address 52 (field 68) may be don't cares in the present embodiment. However, the value provided in field 68 may be written to the tag of the entry if the direct access transaction is a write.

It is noted that the bits comprising offset field 54 may not actually be transmitted on one embodiment of bus 24. Instead, byte enables may be transmitted indicating which bytes are accessed by the transaction. The byte enable for the byte identified by offset field 54 is set, and additional byte enables based on the size of the transaction may be set.

Figure 4:
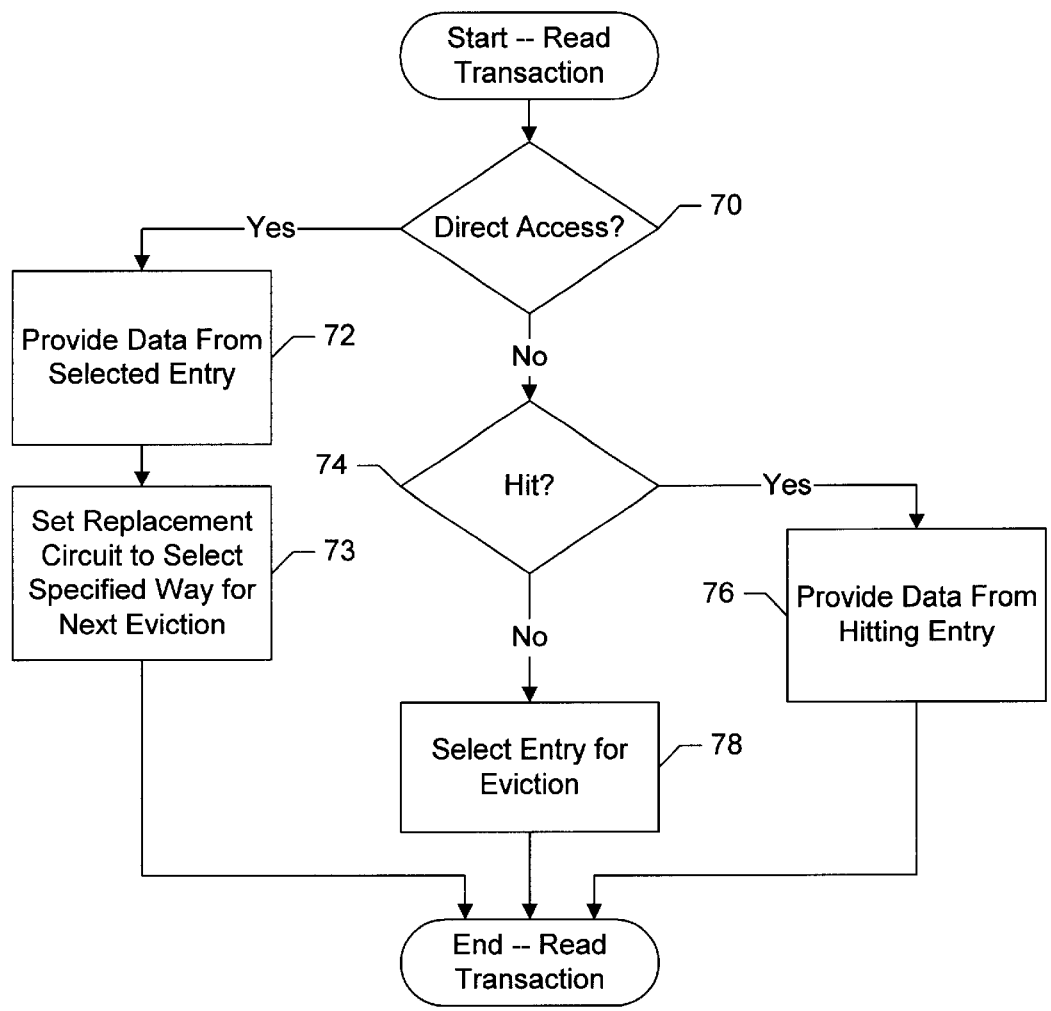
FIG. 4 is a flowchart illustrating operation of one embodiment of the cache shown in FIGS. 1 and 2 for a read transaction.

Turning now to FIG. 4, a flowchart illustrating operation of one embodiment of L2 cache 14 (and more particularly control circuit 36 and/or replacement circuit 44, in the embodiment of FIG. 2) for a read transaction is shown. Other embodiments are possible and contemplated. While the blocks shown in FIG. 4 may be illustrated in a particular order for ease of understanding, the blocks may be performed in parallel by combinatorial logic circuitry within L2 cache 14. Furthermore, various blocks may be performed in different clock cycles (e.g. the operation may be pipelined) according to design choice.

If the read transaction is a direct access transaction (decision block 70), L2 cache 14 provides the data from the selected entry in response to the read transaction (block 72). The selected entry is identified by the explicit index and way provided by the direct access transaction. Whether or not the tag portion of the address in the selected entry matches the address of the read transaction does not affect the forwarding of data, and no cache eviction may occur.

Additionally, replacement circuit 44 may establish a state corresponding to the specified way in response to the direct access transaction (block 73). In other words, the state established may result in an eviction from the specified way if the next transaction is a miss in L2 cache 14.

If the read transaction is a memory transaction ("no" leg of decision block 70), L2 cache 14 determines if the address hits (decision block 74). If the address hits, the data from the hitting entry is provided in response to the read transaction (block 76). If the read transaction is a miss, L2 cache 14 selects an entry for eviction of the cache line stored therein, to be replaced by the cache line accessed by the read transaction (block 78).

Figure 5:
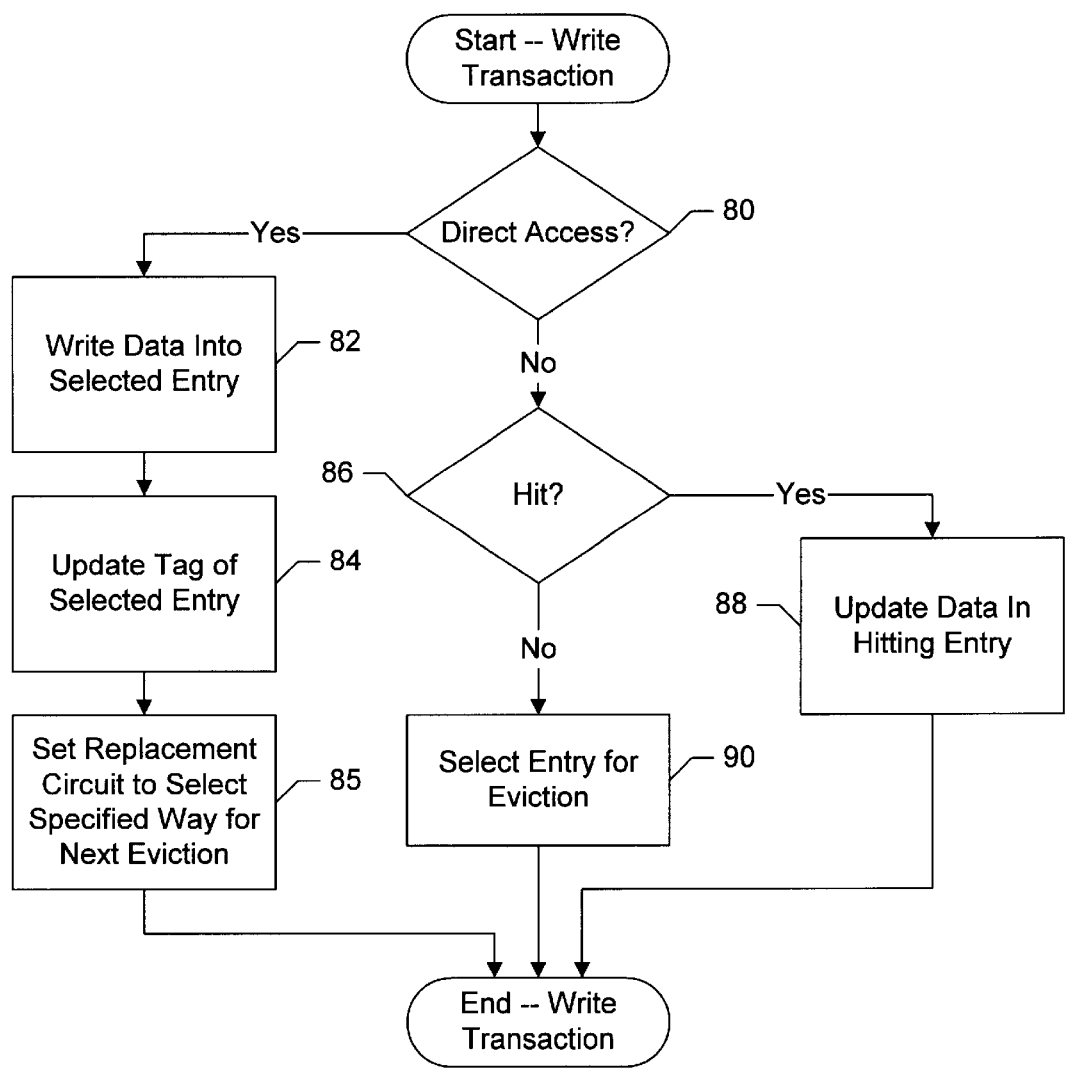
FIG. 5 is a flowchart illustrating operation of one embodiment of the cache shown in FIGS. 1 and 2 for a write transaction.

Turning now to FIG. 5, a flowchart illustrating operation of one embodiment of L2 cache 14 (and more particularly control circuit 36 and/or replacement circuit 44, in the embodiment of FIG. 2) for a write transaction is shown. Other embodiments are possible and contemplated. While the blocks shown in FIG. 5 may be illustrated in a particular order for ease of understanding, the blocks may be performed in parallel by combinatorial logic circuitry within L2 cache 14. Furthermore, various blocks may be performed in different clock cycles (e.g. the operation may be pipelined) according to design choice.

If the write transaction is a direct access transaction (decision block 80), L2 cache 14 stores the data included in the write transaction into the selected entry (block 82). The selected entry is identified by the explicit index and way provided by the direct access transaction. Whether or not the tag portion of the address in the selected entry matches the address of the write transaction does not affect the updating of the selected entry. Furthermore, if valid data is stored in the entry, that data is overwritten (even if the tag does not match the address of the write transaction). Additionally, the tag of the selected entry may be updated with the corresponding portion of the address of the write transaction (block 84). In this manner, the entry may not be affected by coherency activity in the memory address space.

Still further, replacement circuit 44 may establish a state corresponding to the specified way in response to the direct access transaction (block 85). In other words, the state established may result in an eviction from the specified way if the next transaction is a miss in L2 cache 14.

If the write transaction is a memory transaction ("no" leg of decision block 80), L2 cache 14 determines if the address hits (decision block 86). If the address hits, the data included in the write transaction is written to the hitting entry (block 88). If the write transaction is a miss, L2 cache 14 selects an entry for eviction of the cache line stored therein, to be replaced by the cache line accessed by the write transaction (block 90).

While the embodiment illustrated via FIG. 5 allocates an entry for write memory transactions which miss L2 cache 14, other embodiments may not allocate an entry for write misses or may provide for programmability of write allocation, as desired. Additionally, the embodiment illustrated via FIGS. 4 and 5 assumes that the transaction is cacheable in L2 cache 14. Some embodiments may provide for indicating the cacheability of each transaction. If a transaction is indicated to be non-cacheable, L2 cache 14 may not respond to the transaction.

Figure 6:
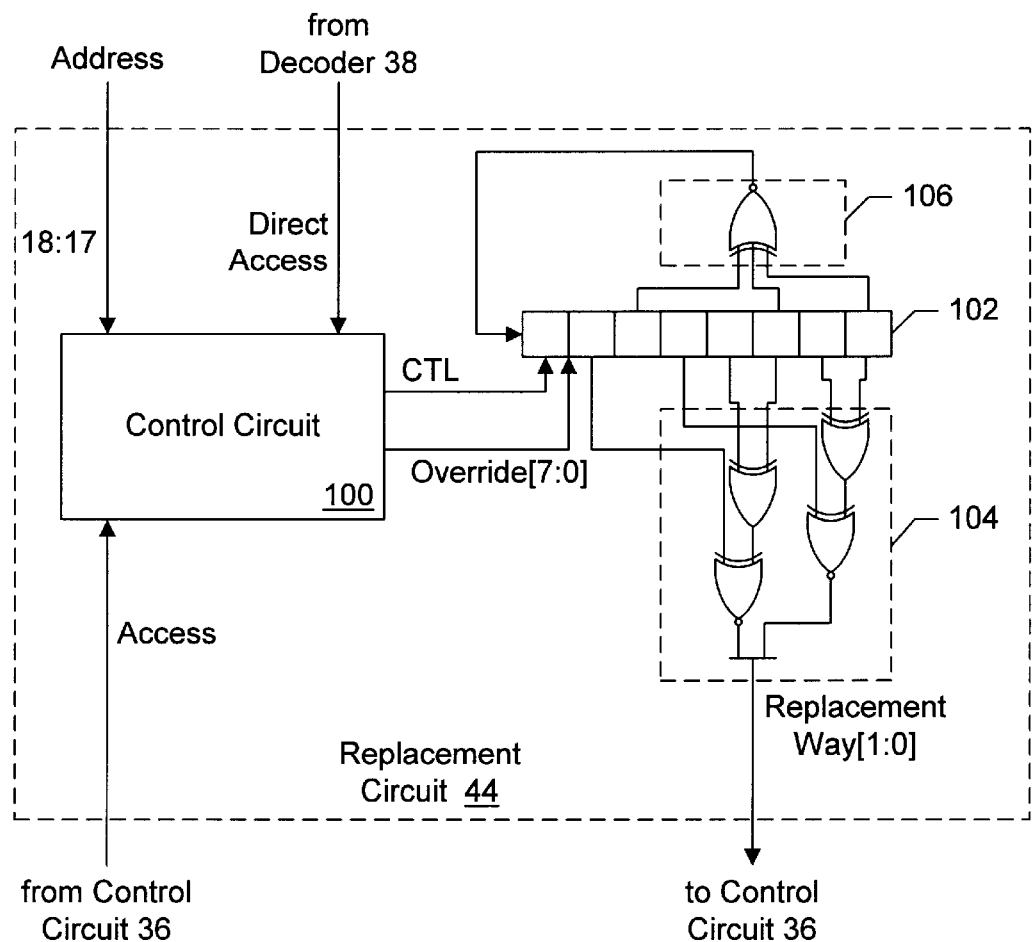
FIG. 6 is a block diagram of one embodiment of a replacement circuit shown in FIG. 2.

Turning next to FIG. 6, a block diagram of one embodiment of replacement circuit 44 is shown. Other embodiments are possible and contemplated. In the embodiment of FIG. 6, replacement circuit 44 includes a control circuit 100, a register 102, an output circuit 104, and a next state circuit 106. Control circuit 100 is coupled to receive the direct access signal from decoder 38, the portion of the input address specifying the way for direct access transactions, and an access signal from control circuit 36. Control circuit 100 is coupled to provide control signals and an override value to register 102, which is coupled to output circuit 104 and next state circuit 106. Output circuit 104 is coupled to provide a replacement way to control circuit 36.

Generally, replacement circuit 44 provides a replacement way to control circuit 36 for use in evicting a cache line if a miss is detected. Register 102 stores a state of replacement circuit 36, and output circuit 104 generates the replacement way from the state. More particularly, output circuit 104 may logically combine various bits from register 102 to generate the replacement way. The logic gates and bits combined by the logic gates as illustrated in output circuit 104 are merely exemplary. Any bits may be combined in any logic equation to generate the replacement way.

In the illustrated embodiment, replacement circuit 44 changes state for each access of L2 cache 14 (irrespective of whether or not the access hits or misses). Thus, control circuit 36 signals replacement circuit 44 if an access is received by L2 cache 14 via the access signal. Control circuit 100 may cause register 102 to capture a new state in response to the access signal. More particularly, register 102 may be a linear feedback shift register. Next state circuit 106 may generate a bit to be shifted into register 102, and the remaining bits may be shifted to the right (as illustrated in FIG. 6), with the rightmost bit being deleted from register 102. Control circuit 100 may assert a shift control signal to register 102, causing register 102 to shift in the bit from next state circuit 106 and shift the remaining bits. The logic gate and bits combined by the logic gate as illustrated in next state circuit 106 are merely exemplary. Any bits may be combined in any logic equation to generate the next state. Generally, the combination of output circuit 104 and next state circuit 106 may be selected so that the distribution of ways selected over time has reasonable dispersion (e.g. the pattern of ways selected over consecutive state changes tends not to select the same way consecutively and repeatedly).

On the other hand, if a direct access transaction is received (signalled via the direct access signal from decoder 38), control circuit 100 overrides the value in register 102 with a predetermined value. The predetermined value represents a state in register 102 which generates a particular way as the replacement way to control circuit 36. The particular way is the way indicated by the direct access transaction, which is received by control circuit 100. Accordingly, control circuit 100 may select the predetermined value from one of a set of predetermined values (one for each way of L2 cache 14). The predetermined value is provided to register 102 (override[7:0] in FIG. 6), and control circuit 100 asserts a control signal to register 102 causing register 102 to update with the predetermined value.

In the illustrated embodiment, register 102 may be an eight bit register. However, any number of bits may be used in other embodiments. For the illustrated embodiment, table 1 below provides an example of predetermined values that may be used by control circuit 100 to establish a state in register 102 which causes the way identified by a direct access transaction to be the way used for a succeeding miss. The values are shown in binary, with bit 0 being the rightmost bit of register 102 as shown in FIG. 6 and bit 7 being the leftmost bit of register 102. Don't care bits are shown as an "x" and may be zero or one (or may be left at the state currently in register 102). Any other predetermined values which generate the desired replacement way for the circuitry shown in FIG. 6 may be used as well.

TABLE 1

Exemplary Values for Loading into Register

| Direct Access Way | Override[7:0] |
|---|---|
| 0 | x1x10000 |
| 1 | x1x00000 |
| 2 | x0x10000 |
| 3 | x0x00000 |

In the illustrated embodiment, register 102 may be a linear feedback shift register. However, other embodiments may employ other registers. For example, a counter could be used to count through the possible ways, rather than the linear feedback shift register.

It is noted that, rather than using direct access transactions to set the state of replacement circuit 44, other transactions may be used. For example, register 102 may be memory mapped, and a memory mapped write to register 102 may set the state. Alternatively, the memory mapped write may provide the desired way, and the corresponding state may be set. In yet another example, a dedicated bus command may be used to convey the state or desired way.

It is further noted that, while the above discussion refers to a set associative cache, a similar replacement circuit may be used for a fully associative cache (in which each entry is effectively a way of the cache). Generally, an "associative cache" may be any type of cache in which two or more entries are eligible to store data corresponding to a given address. An associative cache may include both set associative and fully associative caches.

Figure 7:
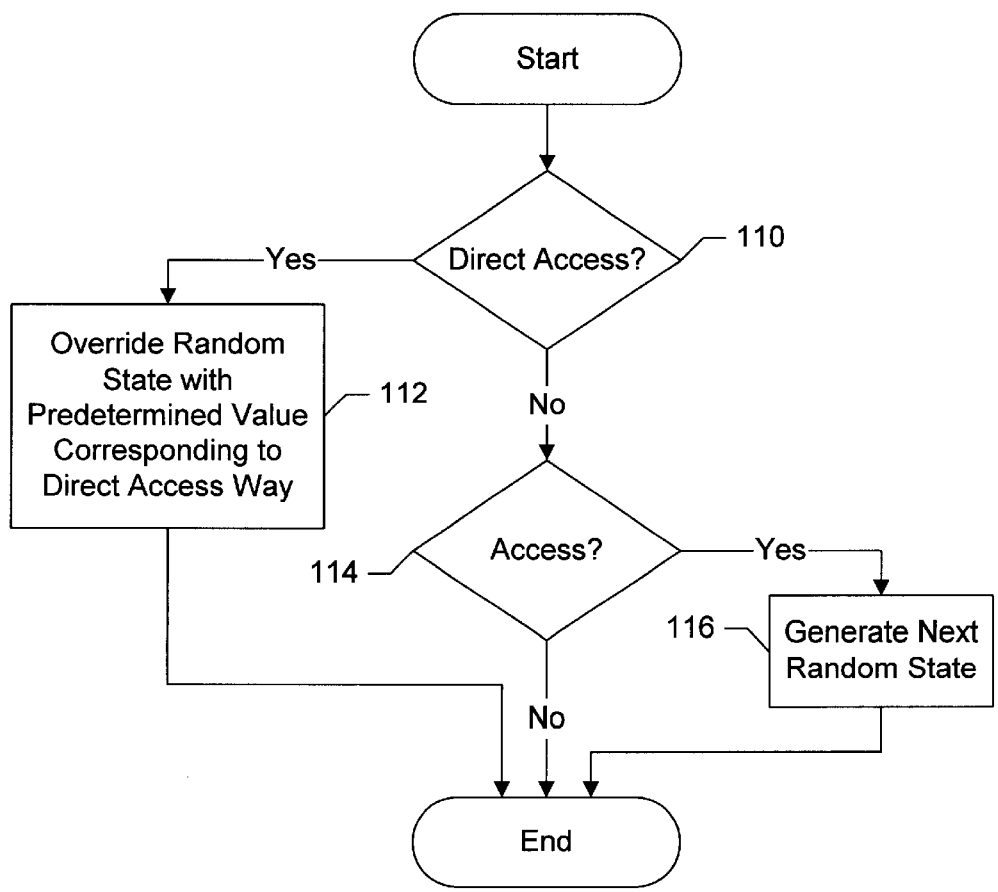
FIG. 7 is a flowchart illustrating operation of one embodiment of a control unit shown in FIG. 6.

Turning now to FIG. 7, a flowchart is shown illustrating operation of one embodiment of control circuit 100. Other embodiments are possible and contemplated. While the blocks shown in FIG. 7 may be illustrated in a particular order for ease of understanding, the blocks may be performed in parallel by combinatorial logic circuitry within control circuit 100.

If a direct access transaction is received (decision block 110), control circuit 100 may override the state of replacement circuit 44 with a predetermined value corresponding to the way specified by the direct access transaction (block 112). On the other hand, if a memory access is received (decision block 114), control circuit 100 may cause register 102 to change to the next random state (e.g. to shift in the bit from next state circuit 106 and right shift the other bits—block 116).

Figure 8:
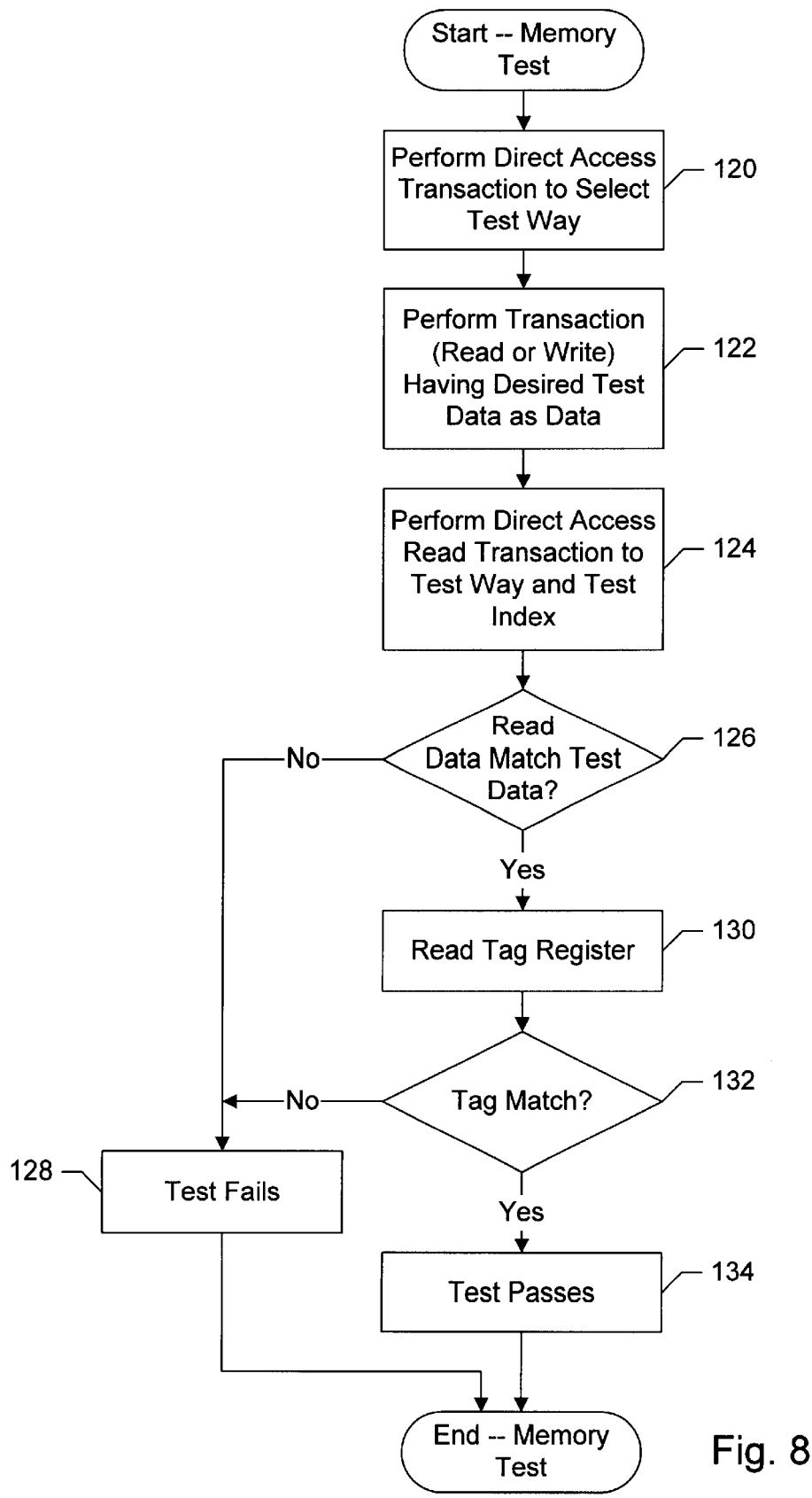
FIG. 8 is a flowchart illustrating one embodiment of testing the cache shown in FIGS. 1 and 2.

Turning next to FIG. 8, a flowchart is shown illustrating an exemplary sequence of transactions which may be performed to achieve a test of an entry in the L2 cache memory. Other embodiments are possible and contemplated. The sequence of transactions could be generated, e.g., by a processor 12A–12B executing a code sequence which includes instructions which result in the transactions. Additionally illustrated in FIG. 8 are certain checks, which could be performed by other instructions than those resulting in the transactions. Alternatively, the sequence of transactions and checks could be performed by any other device connected to bus 24.

A first direct access transaction is performed to select a test way (block 120). More particularly, the replacement circuit in L2 cache 14 may establish the test way as the way to be selected for eviction if the next transaction is a miss in response to the first direct access transaction. The first direct access transaction may be a read or a write.

Subsequent to the first direct access transaction, a memory transaction may be performed (block 122). The memory transaction may be a read or a write, and reads the desired test data from memory 26 or writes the desired test data to memory 26. The memory transaction should be a miss in L2 cache 14, so that L2 cache 14 allocates an entry for the cache line and stores the test data. More particularly, since the first direct access transaction established the test way as the way to be selected for eviction, the entry allocated to the test data is in the test way. The index from the memory transaction address selects the set of entries from which the entry is allocated. Thus, the entry is written with the test data has been directly selected via the first direct access transaction and the memory transaction, and the desired test data has been written to the selected entry.

Subsequent to the memory transaction, a direct access read transaction is performed (block 124). The direct access read transaction explicitly specifies the entry written with the test data (e.g. by index and way). Accordingly, the data returned for the direct access read transaction should be the test data, if no error occurred in storing the data in the entry.

The read data returned in response to the direct access read transaction is compared to the test data (decision block 126). If the read data does not match the test data, then the test fails (block 128).

Additionally, the L2 cache entry includes storage for tag information. The tag is updated with the address of the memory transaction from block 122. In response to the direct access read transaction from block 124, L2 cache 14 stores the tag of the entry in tag register 42. Accordingly, the test may include a read of tag register 42 (block 130). The tag information received in response to the read of the tag register 42 may be compared to corresponding information from the address used in the memory transaction (decision block 132) and expected values for the other information (e.g. valid, dirty, ECC, etc.). If the tag information does not match, then the test fails (block 128). If the tag information does match, then the test passes (block 134).

The above sequence of transactions and checks tests one entry of L2 cache 14. Other entries may be tested by repeating the above sequence for each index and each way within each index. The transactions for each entry may be interleaved with the transactions for other entries, to investigate the possibility of cross coupling between entries. Additionally, the transactions may be repeated for each desired test data pattern or test tag pattern, to allow for robust testing of the memory.

While the above transactions include a first direct access transaction to set the test way, a memory transaction to store the test data in the selected entry, and a direct access read transaction to read the data for validation, an alternative is contemplated. In the alternative, a direct access write transaction is used to store the test data and a direct access read transaction is used to read the test data for comparison.

Figure 9:
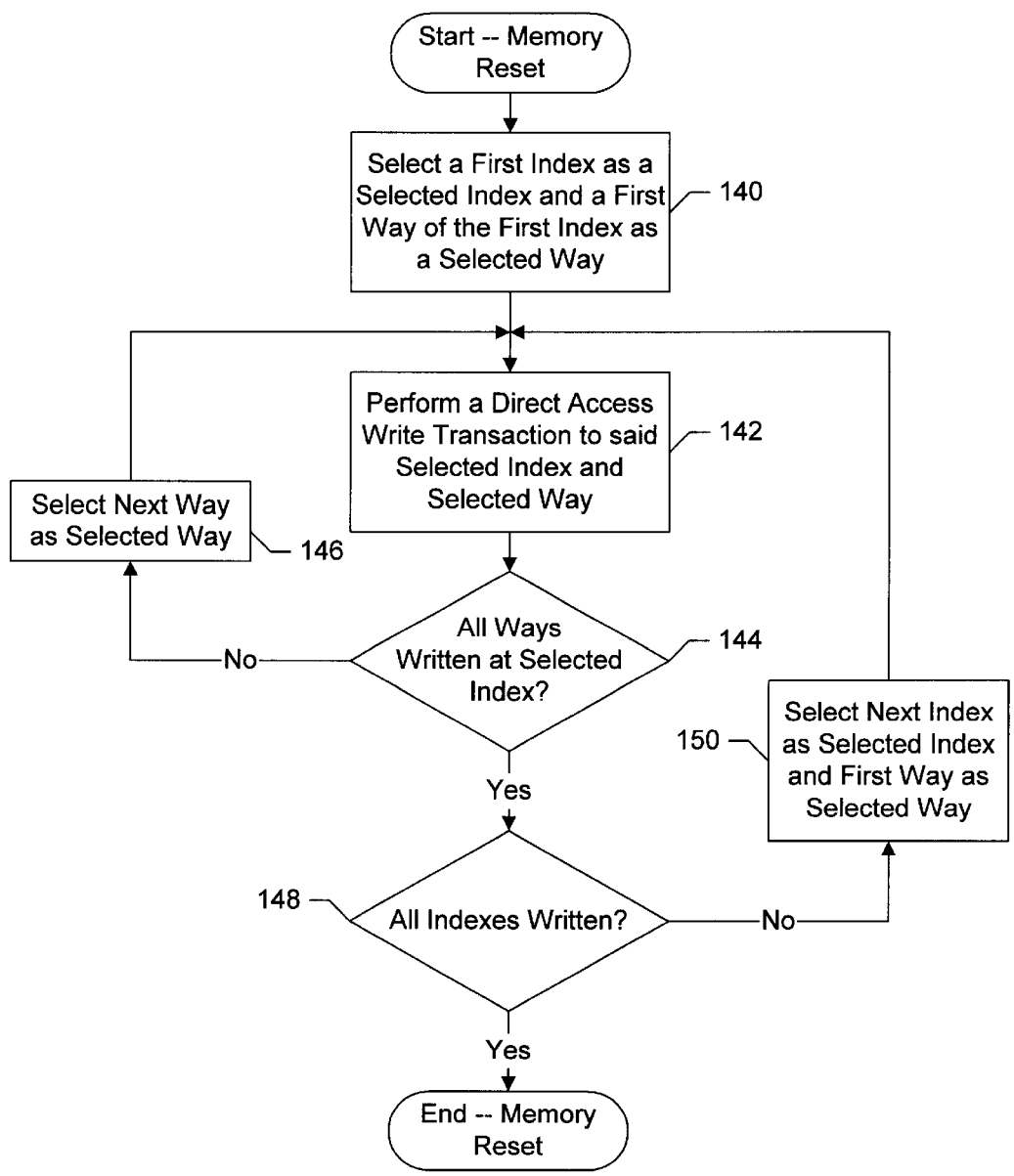
FIG. 9 is a flowchart illustrating one embodiment of resetting the cache shown in FIGS. 1 and 2.

Turning now to FIG. 9, a flowchart is shown illustrating an exemplary sequence of transactions which may be performed to achieve a reset of the L2 cache memory. Other embodiments are possible and contemplated. The sequence of transactions could be generated, e.g., by a processor 12A–12B executing a code sequence which includes instructions which result in the transactions. Alternatively, the sequence of transactions and checks could be performed by any other device connected to bus 24.

To begin the reset sequence, a first index is selected as the selected index and a first way is selected as the selected way (block 140). For example, index zero and way zero may be selected as the selected index and selected way.

A direct access write transaction is performed to the selected index and the selected way (block 142). The data for the direct access write transaction may be any data, and the data is written to the entry corresponding to the selected index and the selected way. The valid indication carried by the address of the direct access write transaction may be set to zero to indicate that the cache line in the entry is invalid. However, the data is set to a known state. Since evictions are not performed for direct access transactions, the data formerly stored in the entry is overwritten without causing an eviction. Additionally, for embodiments employing ECC protection, correct ECC data is written so no ECC errors should occur after the L2 cache is reset.

If all ways at the selected index have not been written with direct access transactions (decision block 144), the next consecutive way is selected as the selected way (block 146). Block 142 is then repeated for the selected index and selected way. Once all ways at the selected index have been written, unless all indexes have been processed (decision block 148), the next index is selected as the selected index and the first way is selected as the selected way (block 150). Block 142 is then repeated for the selected index and the selected way.

In other words, block 142 is repeated for each index and each way within each index. The order of traversal (first all the ways of the index and then moving to the next index versus all the indexes in one way and then moving to the next way) is unimportant and may be varied as desired. Subsequent to performing block 142 for each index and each way within each index, L2 cache 14 has been reset and all entries are storing information of a known state. Thus, ensuring that the L2 cache memory resets to a known state in hardware may not be required. Instead, direct access transactions may be used to perform the reset.

Figure 10:
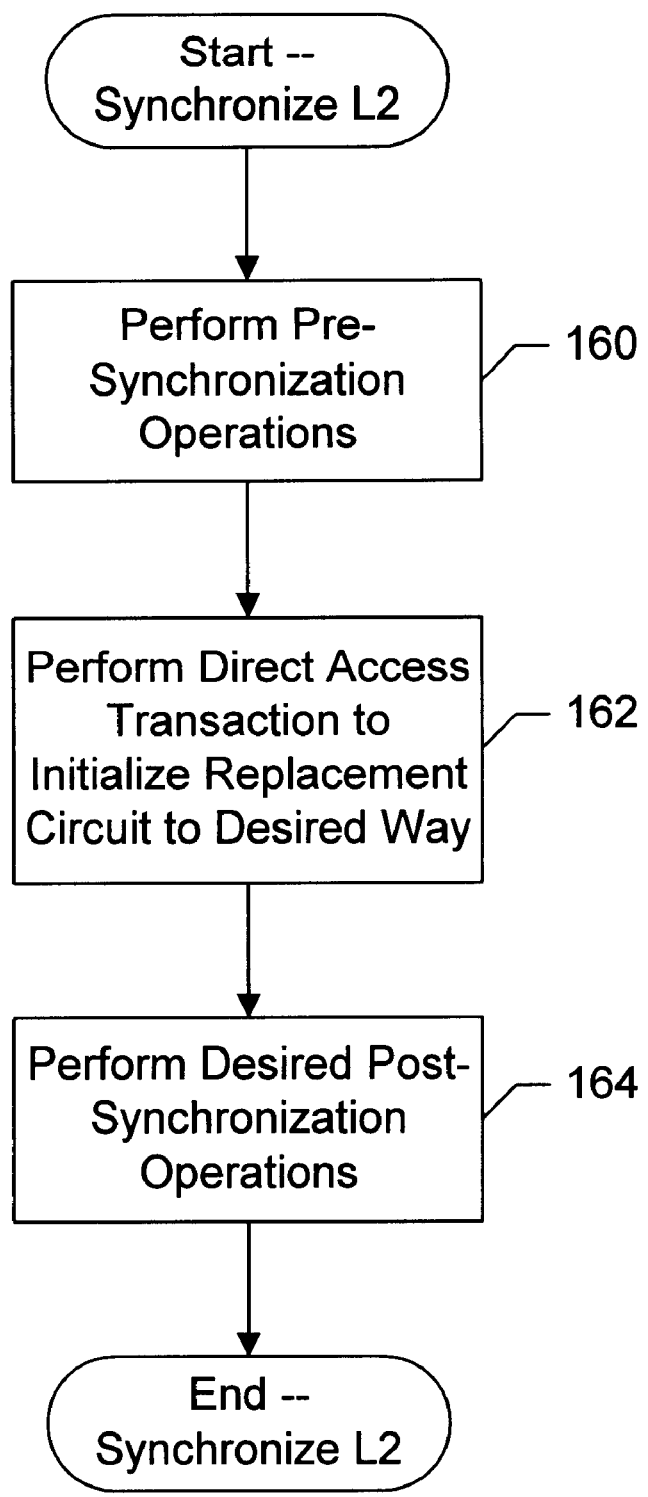
FIG. 10 is a flowchart illustrating one embodiment of synchronization of the cache shown in FIGS. 1 and 2.

Turning next to FIG. 10, a flowchart is shown illustrating an exemplary sequence of transactions which may be performed to synchronize the L2 cache (particularly the pseudo-random replacement algorithm). Other embodiments are possible and contemplated. The sequence of transactions could be generated, e.g., by a processor 12A–12B executing a code sequence which includes instructions which result in the transactions. Alternatively, the sequence of transactions and checks could be performed by any other device connected to bus 24.

The sequence may include one or more "pre-synchronization" operations (block 160). After the pre-synchronization operations have been performed, a direct access transaction may be performed to initialize the replacement circuit to a desired way explicitly specified by the direct access transaction (block 162). The direct access transaction may be either a read or a write, as desired. Subsequently, one or more "post-synchronization" operations may be performed (block 164).

Synchronizing the L2 cache replacement policy using the deterministic setting provided in response to direct access transactions may have a variety of uses. For example, it may be desirable to run validation tests used to test the L2 cache or other system components in a variety of test environments (e.g. simulation of the VHDL code representing the system 10, emulation in which the system 10 is implemented in programmable logic devices for test purposes, a test board validation environment with the manufactured component or components, and/or a system validation environment with the manufactured component or components). The mechanisms used to establish an initial state in these various environments may differ, and thus the state of the L2 replacement circuit may differ when the test itself is to be started. Having a different state in the replacement circuit may affect the operation of the test, and thus the same validation may not occur. However, by performing the same direct access transaction after the initialization but prior to beginning the test, the same state in the replacement circuit may be established. Additionally, if a particular entry is desired to store data corresponding to a particular transaction within a test, that entry can be selected using a direct access transaction prior to the particular transaction.

Figure 11:
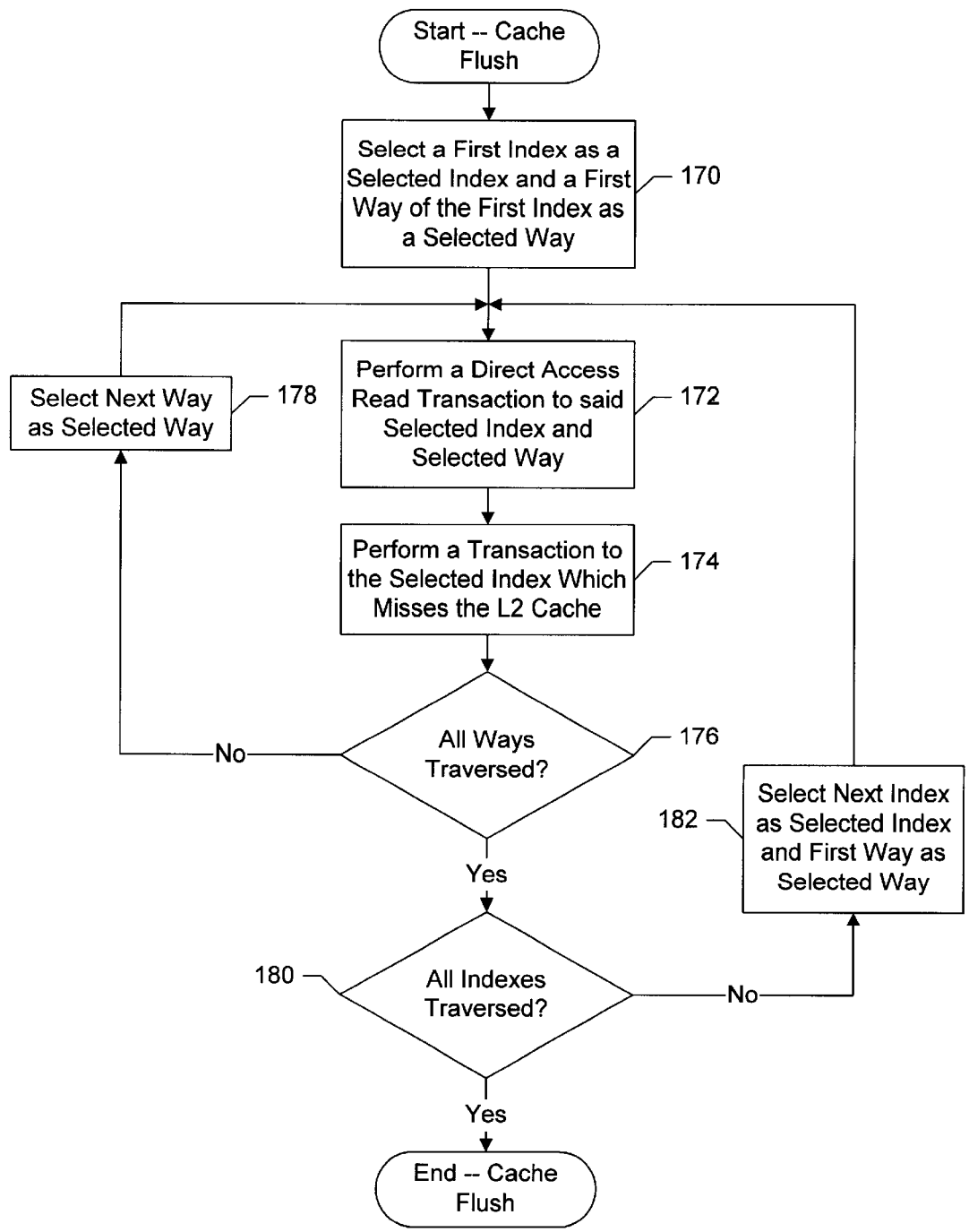
FIG. 11 is a flowchart illustrating one embodiment of flushing the cache shown in FIGS. 1 and 2.

Turning next to FIG. 11, a flowchart is shown illustrating an exemplary sequence of transactions which may be performed to flush the L2 cache without requiring an explicit flush command on bus 24. More particularly, the sequence shown in FIG. 11 may be used to flush every entry of the L2 cache. An entry is flushed if the cache line stored in the entry is invalidated, and the cache line is written to memory 26 if dirty. Other embodiments are possible and contemplated. The sequence of transactions could be generated, e.g., by a processor 12A–12B executing a code sequence which includes instructions which result in the transactions. Alternatively, the sequence of transactions and checks could be performed by any other device connected to bus 24.

To begin the flush sequence, a first index is selected as the selected index and a first way is selected as the selected way (block 170). For example, index zero and way zero may be selected as the selected index and selected way.

A direct access read transaction is performed to the selected index and selected way (block 172). In response to the direct access transaction, replacement circuit 44 establishes a state indicating that the selected way is to be selected for eviction for the next transaction.

After the direct access read transaction, a memory transaction which misses the L2 cache is performed to the selected index (block 174). Since the memory transaction misses, L2 cache 14 allocates an entry for the affected cache line. The entry is allocated from the selected way, evicting the cache line in the selected way.

Blocks 176, 178, 180, and 182 illustrate the repeating of blocks 172 and 174 for each entry in the L2 cache, similar to blocks 144, 146, 148 and 150 shown in FIG. 9. Again, the order of traversal may be any suitable order. After repeating blocks 172 and 174 for each entry, the prior contents of the L2 cache have been flushed, and no explicit flush command was used. Having an explicit flush command may require additional hardware in L2 cache 14, and may occupy a command code point on bus 24, and thus may be undesirable.

Figure 12:
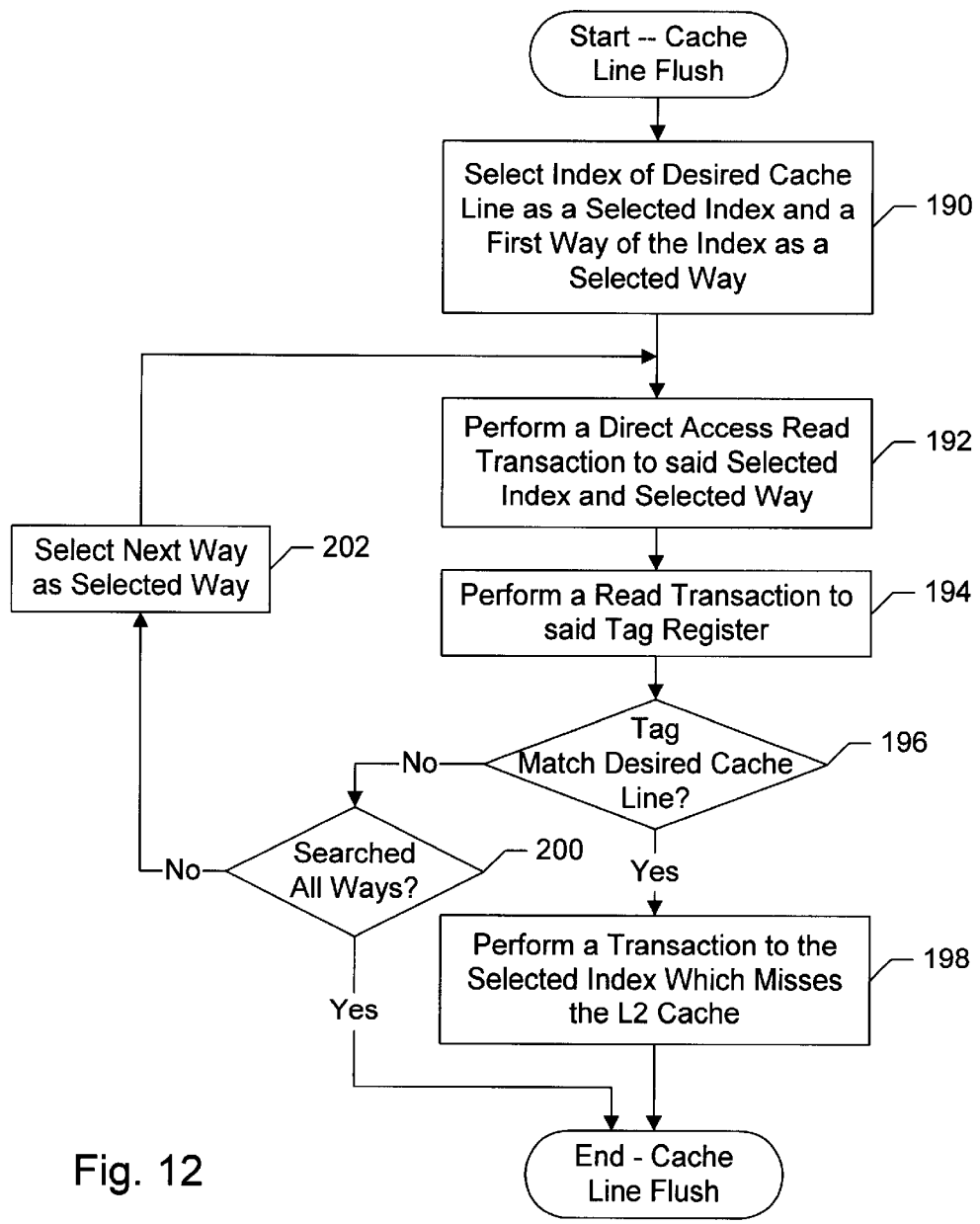
FIG. 12 is a flowchart illustrating one embodiment of flushing one cache line shown in FIGS. 1 and 2.

Turning next to FIG. 12, a flowchart is shown illustrating an exemplary sequence of transactions which may be performed to flush a particular cache line from the L2 cache without requiring an explicit flush command on bus 24. Other embodiments are possible and contemplated. The sequence of transactions could be generated, e.g., by a processor 12A–12B executing a code sequence which includes instructions which result in the transactions. Alternatively, the sequence of transactions and checks could be performed by any other device connected to bus 24.

If a particular cache line is desired to be flushed, the address of the cache line is known. Thus, the index of the desired cache line may be selected as the selected index and the first way of the index may be selected as the selected way (block 190).

A direct access read transaction is performed to the selected index and the selected way (block 192). In response to the direct access read transaction, the replacement circuit 44 establishes a state indicating that the selected way is to be selected for eviction for the next transaction. Additionally, the tag of the entry explicitly identified (by the selected index and selected way) is stored into tag register 42.

A read transaction may subsequently be performed to the tag register 42 to retrieve the tag information corresponding to the entry identified by the above direct access read transaction (block 194). Since the read transaction is not a direct access transaction nor an access to the cache memory, the replacement policy may be unaffected by the read transaction.

If the tag information matches the corresponding address of the desired cache line (decision block 196), a transaction to the selected index which misses L2 cache 14 may be performed (block 198). Since the transaction misses, an eviction occurs and, due to the setting of the replacement policy via the direct access read transaction, the way storing the desired cache line is the way selected for eviction. Thus, the desired cache line is flushed from L2 cache 14.

On the other hand, if the tag information does not match the corresponding address of the desired cache line (decision block 196), and all ways within the selected index have not yet been searched (decision block 200) then the next consecutive way is selected (block 202) as the selected way and blocks 192, 194, and 196 may be repeated. If all ways are exhausted without finding a tag match, then the desired cache line is not stored in the cache and thus the flush is not needed.

While FIGS. 8–12 have illustrated various uses for the direct access transactions and/or the deterministic setting of the replacement policy, these features of the cache may be used for a variety of uses. Furthermore, any cache may employ these features.

Figure 13:
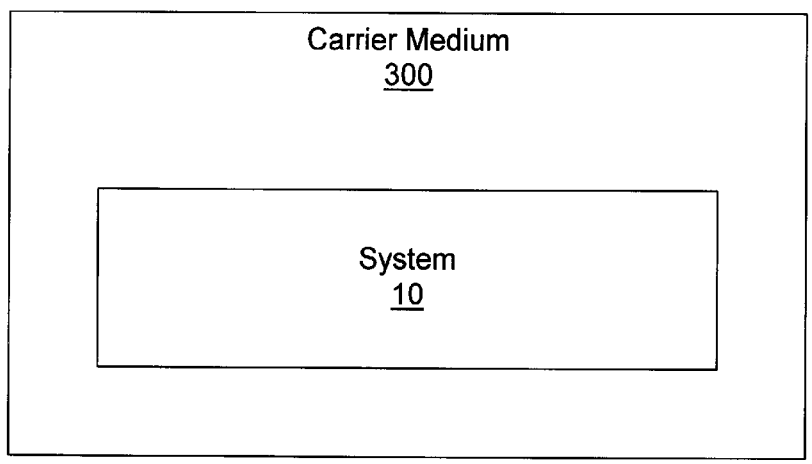
FIG. 13 is a block diagram of an exemplary carrier medium.

Turning next to FIG. 13, a block diagram of a carrier medium 300 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 300 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates in a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 300 may be the netlist (with or without the synthesis library) or the data set, as desired.

While carrier medium 300 carries a representation of system 10, other embodiments may carry a representation of any portion of system 10, as desired, including any set of one or more agents (e.g. processors, L2 cache, memory controller, etc.) or circuitry therein (e.g. replacement circuits, caches, tags, etc.), etc.

Numerous variations and modifications will become apparent to those skilled in the art once the above disclosure is fully appreciated. It is intended that the following claims be interpreted to embrace all such variations and modifications.

What is claimed is:

1. A cache comprising:
    a memory including a plurality of entries, wherein each of said plurality of entries is configured to store a cache line of data; and
    a control circuit coupled to said memory, said control circuit configured to select a first entry of said plurality of entries for access responsive to a first transaction which explicitly specifies said first entry independent of whether or not said first transaction hits said first entry, and wherein said control circuit is configured to differentiate said first transaction from a memory transaction responsive to a transaction attribute transmitted to said cache as part of each transaction, and wherein said control circuit is configured to select said first entry for access responsive to said memory transaction and dependent on said memory transaction hitting said first entry.

2. The cache as recited in claim 1 wherein said cache is set associative, and wherein said first transaction explicitly specifies a first index and a first way corresponding to said first entry.

3. The cache as recited in claim 2 wherein said first transaction includes a first address, and wherein said first address includes an index portion specifying said first index, and wherein said first address includes a way portion specifying said first way.

4. The cache as recited in claim 1, wherein said first transaction includes a first address, and wherein said first address is included in a first address space separate from a second address space corresponding to a memory system.

5. The cache as recited in claim 2 further comprising a replacement circuit configured to select a way for eviction in response to a cache miss, and wherein said replacement circuit is configured to select said first way for a subsequent cache miss responsive to said first transaction.

6. The cache as recited in claim 1 wherein said first transaction is a write transaction, and wherein said write transaction includes first data, and wherein said control circuit causes said first data to be written to said first entry responsive to said write transaction.

7. The cache as recited in claim 6 wherein said first entry further includes a tag information, and wherein said control circuit causes a tag portion of a first address of said write transaction to be written to said tag information.

8. The cache as recited in claim 6 wherein said first entry further includes a tag information, and wherein said first address includes a first valid indication, and wherein said tag information includes a valid indication, and wherein said control circuit is configured to cause said first valid indication to be written to said valid indication of said tag information.

9. The cache as recited in claim 6 wherein said first entry further includes a tag information, and wherein said first address includes a first dirty indication, and wherein said tag information includes a dirty indication, and wherein said control circuit is configured to cause said first dirty indication to be written to said dirty indication of said tag information.

10. The cache as recited in claim 1 wherein said first transaction is a read transaction, and wherein said cache is configured to return first data from said first entry responsive to said read transaction.

11. The cache as recited in claim 1 further comprising a register coupled to receive a tag information from said first entry responsive to said first transaction.

12. The cache as recited in claim 11 wherein said control circuit is configured to cause a contents of said register to be returned in response to a second transaction targeting said register.

13. The cache as recited in claim 1 wherein the transaction attribute comprises an address of the transaction.

14. A system comprising:
    a cache including a plurality of entries, wherein each of said plurality of entries is configured to store a cache line of data; and
    a first circuit coupled to said cache, wherein said first circuit is configured to initiate a first transaction explicitly specifying a first entry of said plurality of entries independent of whether or not said first transaction hits said first entry;
    wherein said cache is configured to select said first entry for access responsive to said first transaction even if said first transaction does not hit in said first entry, and wherein said cache is configured to differentiate said first transaction from a memory transaction responsive to a transaction attribute transmitted to said cache as part of each transaction.

15. The system as recited in claim 14 wherein said cache is set associative, and wherein said first transaction explicitly specifies a first index and a first way corresponding to said first entry.

16. The system as recited in claim 15 wherein said first transaction includes a first address, and wherein said first address includes an index portion specifying said first index, and wherein said first address includes a way portion specifying said first way.

17. The system as recited in claim 14 wherein said first transaction includes a first address, and wherein said first address is included in a first address space separate from a second address space corresponding to a memory system.

18. The system as recited in claim 14 wherein said circuit is a processor.

19. The system as recited in claim 14 wherein said circuit is an input/output (I/O) bridge, wherein said I/O bridge is configured to initiate said transaction on behalf of an I/O device coupled thereto.

20. The system as recited in claim 14 wherein the transaction attribute comprises an address of the transaction.

21. A carrier medium comprising a database representing a cache including:
    a memory including a plurality of entries, wherein each of said plurality of entries is configured to store a cache line of data; and
    a control circuit coupled to said memory, said control circuit configured to select a first entry of said plurality of entries for access responsive to a first transaction which explicitly specifies said first entry independent of whether or not said first transaction hits said first entry, and wherein said control circuit is configured to differentiate said first transaction from a memory transaction responsive to a transaction attribute transmitted to said cache as part of each transaction, and wherein said control circuit is configured to select said first entry for access responsive to said memory transaction and dependent on said memory transaction hitting said first entry.

22. The carrier medium as recited in claim 21 wherein said cache is set associative, and wherein said first transaction explicitly specifies a first index and a first way corresponding to said first entry.

23. The carrier medium as recited in claim 22 wherein said first transaction includes a first address, and wherein said first address includes an index portion specifying said first index, and wherein said first address includes a way portion specifying said first way.

24. The carrier medium as recited in claim 22 further comprising a replacement circuit configured to select a way for eviction in response to a cache miss, and wherein said replacement circuit is configured to select said first way for a subsequent cache miss responsive to said first transaction.

25. The carrier medium as recited in claim 21, wherein said first transaction includes a first address, and wherein said first address is included in a first address space separate from a second address space corresponding to a memory system.

26. The carrier medium as recited in claim 21 wherein said first transaction is a write transaction, and wherein said write transaction includes first data, and wherein said control circuit causes said first data to be written to said first entry responsive to said write transaction.

27. The carrier medium as recited in claim 26 wherein said first entry further includes a tag information, and wherein said control circuit causes a tag portion of a first address of said write transaction to be written to said tag information.

28. The carrier medium as recited in claim 26 wherein said first entry further includes a tag information, and wherein said first address includes a first valid indication, and wherein said tag information includes a valid indication, and wherein said control circuit is configured to cause said first valid indication to be written to said valid indication of said tag information.

29. The carrier medium as recited in claim 26 wherein said first entry further includes a tag information, and wherein said first address includes a first dirty indication, and wherein said tag information includes a dirty indication, and wherein said control circuit is configured to cause said first dirty indication to be written to said dirty indication of said tag information.

30. The carrier medium as recited in claim 21 wherein said first transaction is a read transaction, and wherein said cache is configured to return first data from said first entry responsive to said read transaction.

31. The carrier medium as recited in claim 21 wherein the database further represents a register coupled to receive a tag information from said first entry responsive to said first transaction.

32. The carrier medium as recited in claim 31 wherein said control circuit is configured to cause a contents of said register to be returned in response to a second transaction targeting said register.

33. The carrier medium as recited in claim 21 wherein the transaction attribute comprises an address of the transaction.

34. A carrier medium comprising a database representing:
    a cache including a plurality of entries, wherein each of said plurality of entries is configured to store a cache line of data; and
    a first circuit coupled to said cache, wherein said first circuit is configured to initiate a first transaction explicitly specifying a first entry of said plurality of entries independent of whether or not said first transaction hits said first entry;
    wherein said cache is configured to select said first entry for access responsive to said first transaction even if said first transaction does not hit in said first entry, and wherein said cache is configured to differentiate said first transaction from a memory transaction responsive to a transaction attribute transmitted to said cache as part of each transaction.

35. The carrier medium as recited in claim 34 wherein said cache is set associative, and wherein said first transaction explicitly specifies a first index and a first way corresponding to said first entry.

36. The carrier medium as recited in claim 35 wherein said first transaction includes a first address, and wherein said first address includes an index portion specifying said first index, and wherein said first address includes a way portion specifying said first way.

37. The carrier medium as recited in claim 34 wherein said first transaction includes a first address, and wherein said first address is included in a first address space separate from a second address space corresponding to a memory system.

38. The carrier medium as recited in claim 34 wherein said circuit is a processor.

39. The carrier medium as recited in claim 34 wherein said circuit is an input/output (I/O) bridge, wherein said I/O bridge is configured to initiate said transaction on behalf of an I/O device coupled thereto.

40. The carrier medium as recited in claim 34 wherein the transaction attribute comprises an address of the transaction.

* * * * *